US006635979B1

(12) United States Patent
Shiratori et al.

(10) Patent No.: US 6,635,979 B1
(45) Date of Patent: Oct. 21, 2003

(54) ELECTRON EMITTING DEVICE, METHOD OF PRODUCING THE SAME, AND METHOD OF DRIVING THE SAME; AND IMAGE DISPLAY COMPRISING THE ELECTRON EMITTING DEVICE AND METHOD OF PRODUCING THE SAME

(75) Inventors: Tetsuya Shiratori, Osaka (JP); Hideo Kurokawa, Osaka (JP); Masahiro Deguchi, Osaka (JP); Makoto Kitabatake, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,907

(22) PCT Filed: Feb. 9, 1999

(86) PCT No.: PCT/JP99/00543
§ 371 (c)(1),
(2), (4) Date: Sep. 25, 2000

(87) PCT Pub. No.: WO99/40601
PCT Pub. Date: Aug. 12, 1999

(30) Foreign Application Priority Data

Feb. 9, 1998 (JP) .......................................... 10-026945
Jul. 17, 1998 (JP) .......................................... 10-202992

(51) Int. Cl.[7] ................................................ H01J 1/02
(52) U.S. Cl. ........................ 313/309; 313/336; 313/310; 313/495
(58) Field of Search ............................... 313/309, 336, 313/351, 310, 495

(56) References Cited

U.S. PATENT DOCUMENTS 3,615,901 A * 10/1971 Medicus ..................... 419/10
5,729,094 A * 3/1998 Geis et al. ..................... 257/77
5,747,918 A * 5/1998 Eom et al. ................... 313/309
5,777,427 A * 7/1998 Tanaka et al. ............... 313/309
5,828,162 A * 10/1998 Danroc et al. ............... 313/309
5,936,257 A * 8/1999 Kusunoki et al. ............. 257/10
5,944,573 A * 8/1999 Mearini et al. ................ 445/24

(List continued on next page.)

FOREIGN PATENT DOCUMENTS

| JP | 56-167456 | 12/1981 |
| JP | 6-318428 | 11/1994 |
| JP | 7-282715 | 10/1995 |
| JP | 8-236010 | 9/1996 |
| JP | 8-321256 | 12/1996 |
| JP | 9-7499 | 1/1997 |
| JP | 9-55162 | 2/1997 |
| JP | 9-270227 | 10/1997 |
| JP | 9-320450 | 12/1997 |

OTHER PUBLICATIONS

International Search Report dated May 25, 1999 for PCT/JP99/00543.

Primary Examiner—Ashok Patel
Assistant Examiner—Glenn Zimmerman
(74) Attorney, Agent, or Firm—RatnerPrestia

(57) ABSTRACT

An electron emitting device includes at least an electron transporting member (1), an electron emitting member (3), and an electric field concentration region (2) formed between the electron transporting member (1) and the electron emitting member (3). For example, the electron transporting member (1) may be a conductive layer, the electric field concentration region (2) may be formed of an insulating layer formed on the conductive layer, and the electron emitting member (3) may be formed of particles provided on the insulating layer. Due to the electric field concentration in the electric field concentration region (2), electrons are easily injected from the electron transporting member (1) to the electron emitting member (3).

34 Claims, 28 Drawing Sheets

U.S. PATENT DOCUMENTS

| | | | | |
|---|---|---|---|---|
| 5,973,451 A | * | 10/1999 | Geis et al. | 313/309 |
| 5,977,697 A | * | 11/1999 | Jin et al. | 313/310 |
| 5,986,390 A | * | 11/1999 | Chuman et al. | 313/309 |
| 5,990,605 A | * | 11/1999 | Yoshikawa et al. | 313/309 |
| 6,008,502 A | * | 12/1999 | Deguchi et al. | 257/10 |
| 6,066,922 A | * | 5/2000 | Iwasaki et al. | 313/310 |
| 6,130,504 A | * | 10/2000 | Nakayama et al. | 313/582 |
| 6,144,155 A | * | 11/2000 | Yoshikawa et al. | 313/308 |
| 6,274,881 B1 | * | 8/2001 | Akiyama et al. | 257/10 |
| 6,388,366 B1 | * | 5/2002 | Pryor | 313/310 |

\* cited by examiner

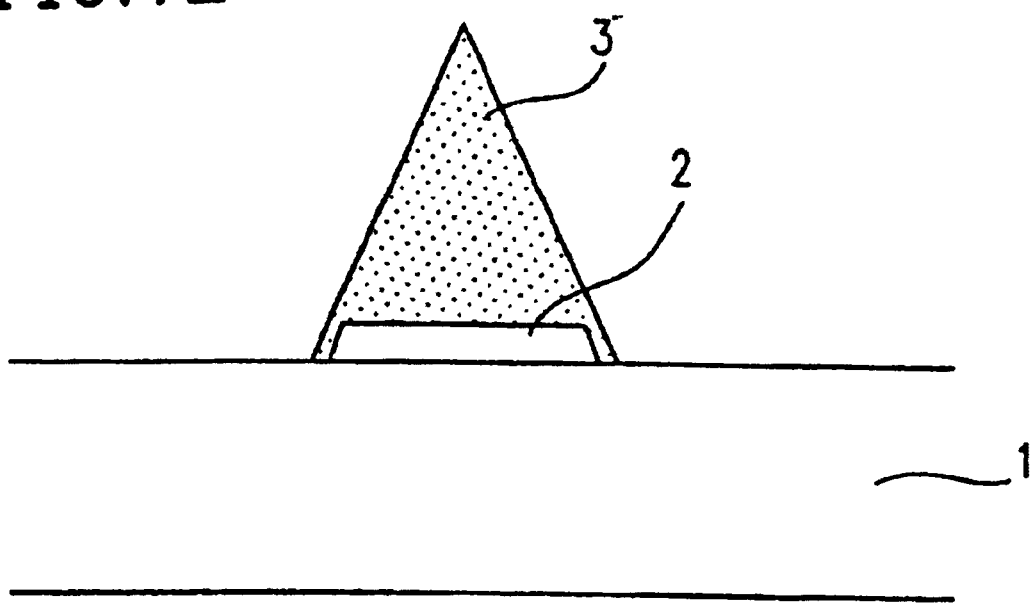

FIG. 9
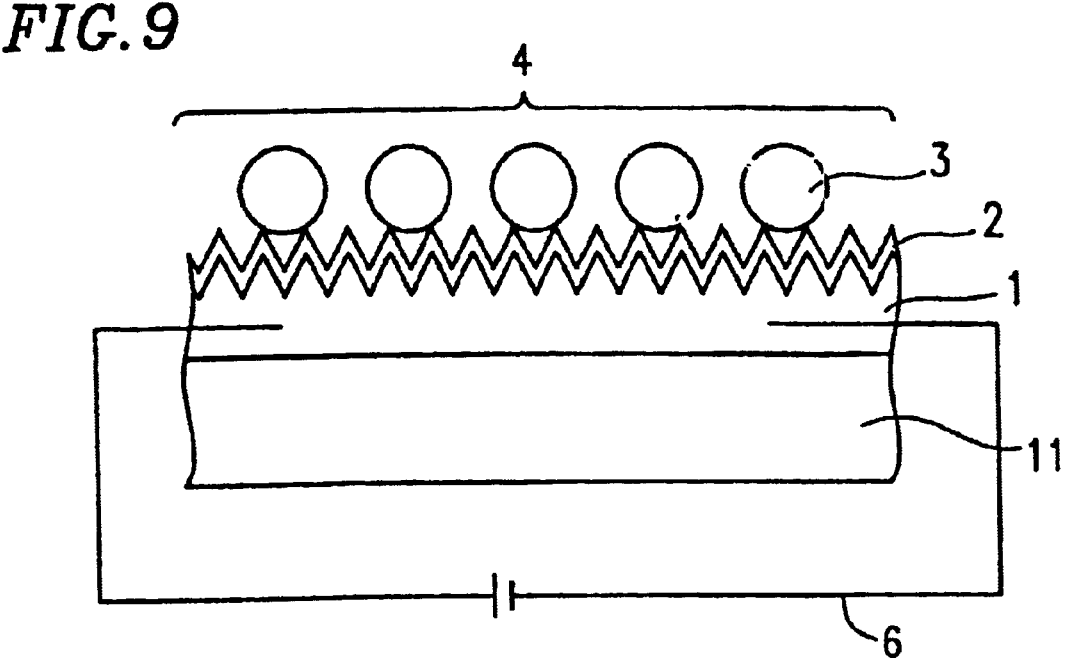
FIG. 10
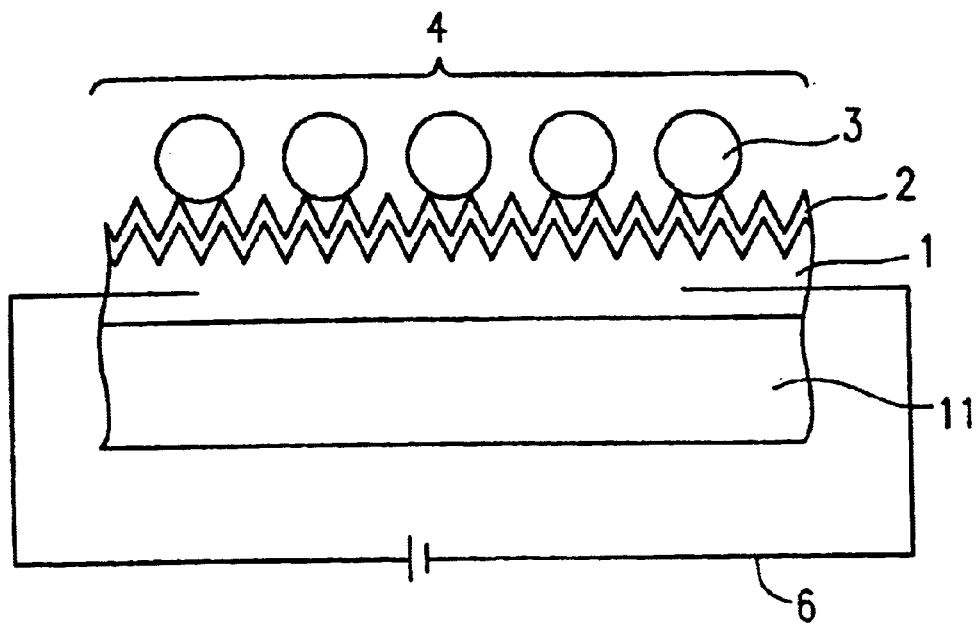

FIG. 19
(a)
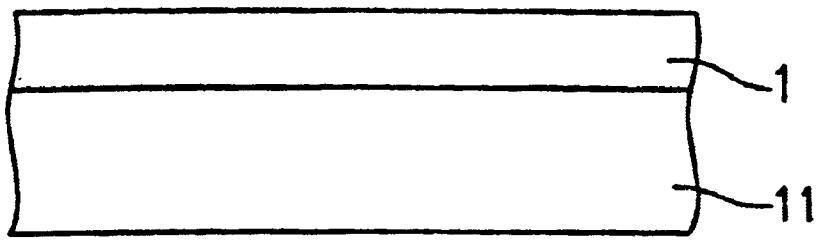
(b)
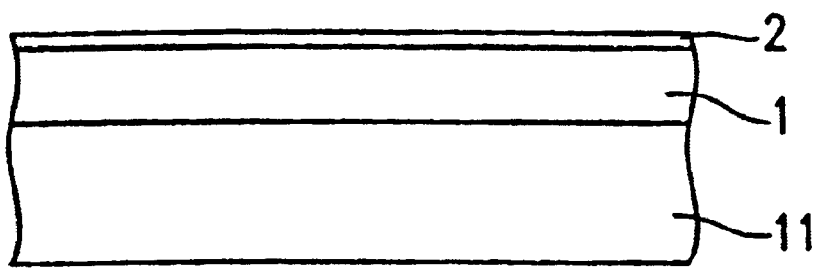
(c)
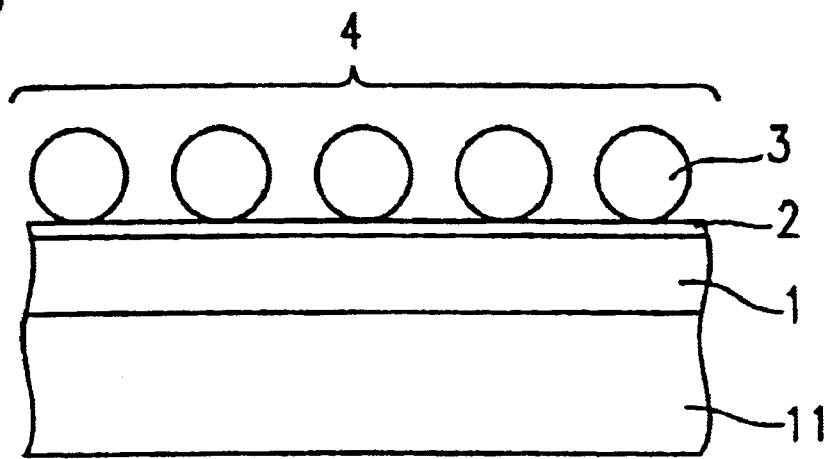

FIG.20
(a)
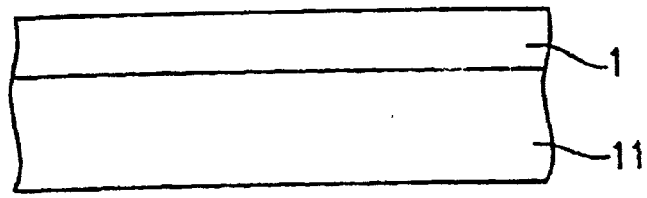
(b)
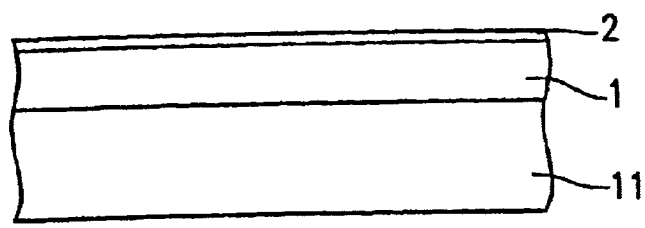
(c)
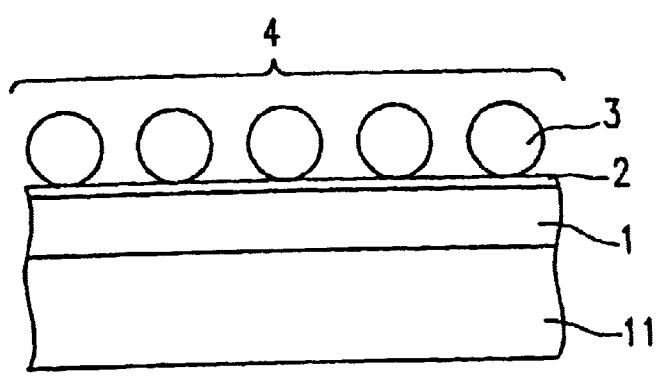
(d)
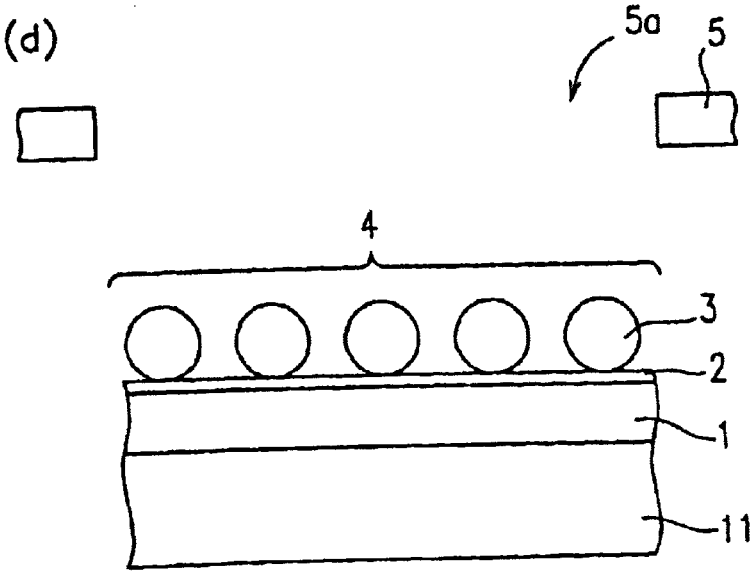

FIG. 21
(a)
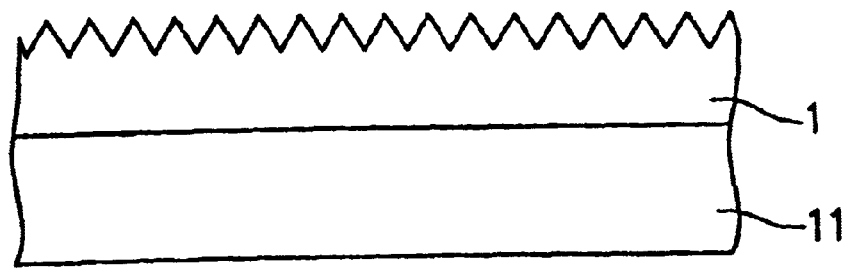
(b)
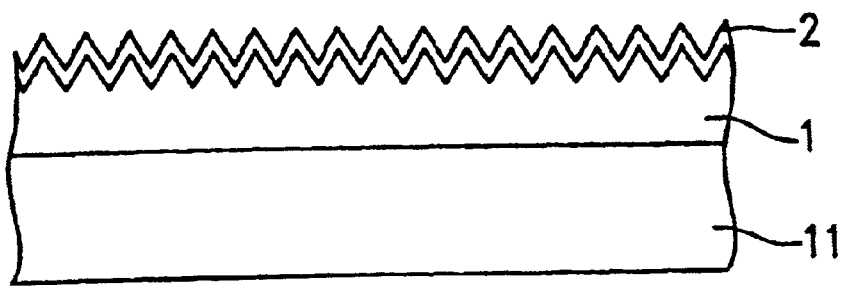
(c)
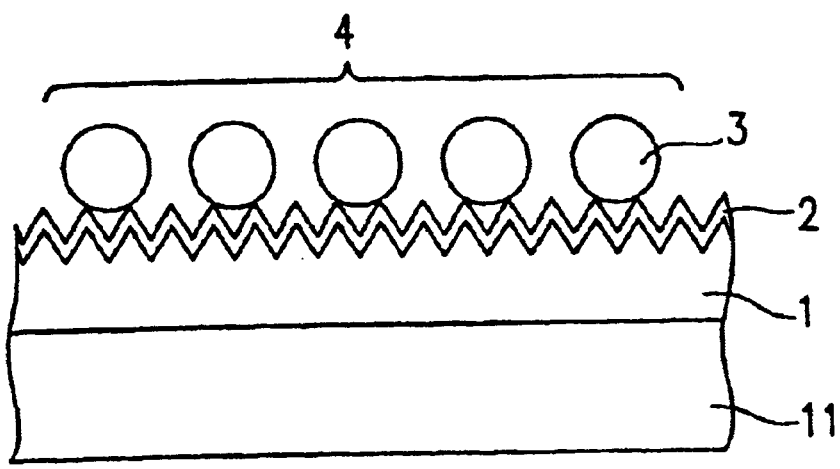

FIG.22
(a)
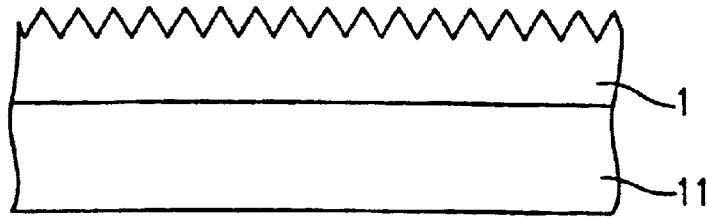
(b)
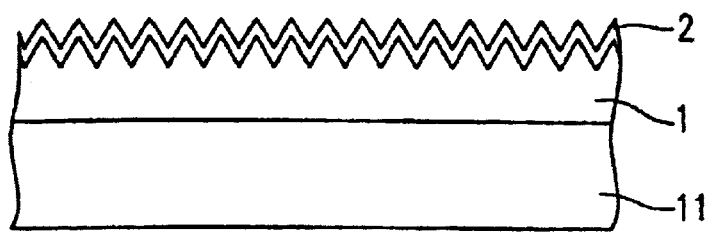
(c)
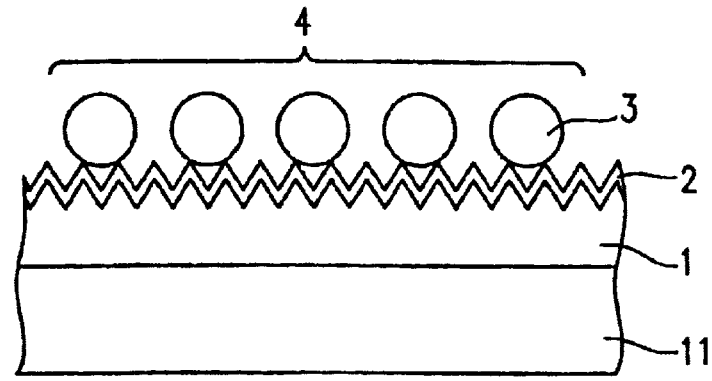
(d)
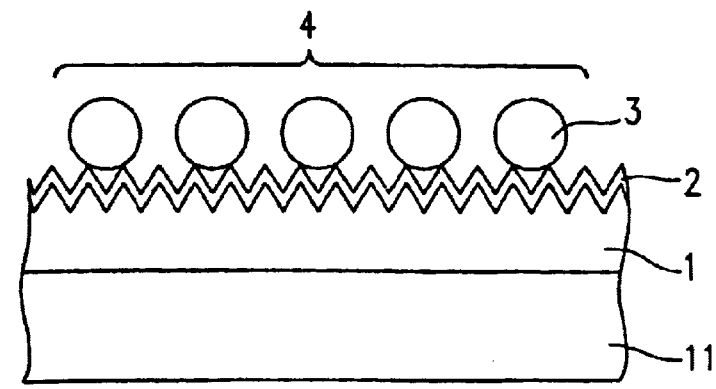

FIG.23
(a)
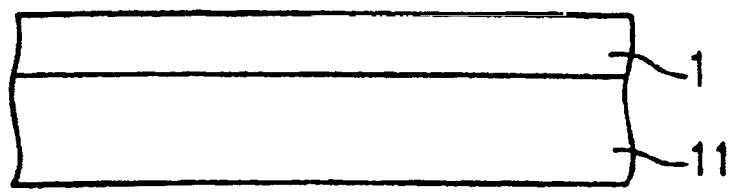
(b)
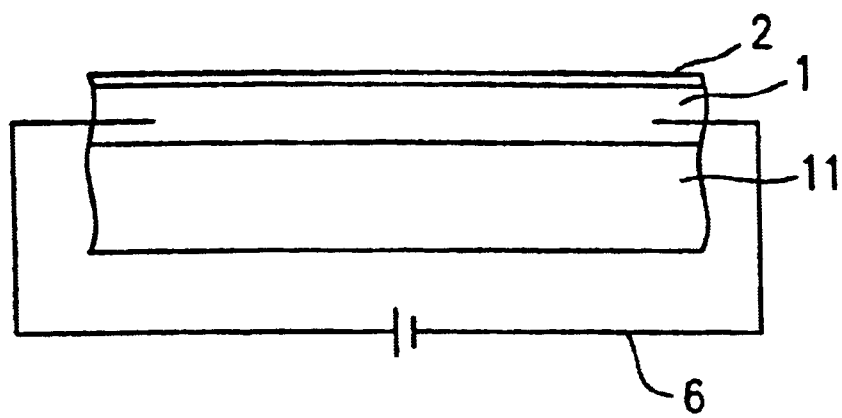
(c)
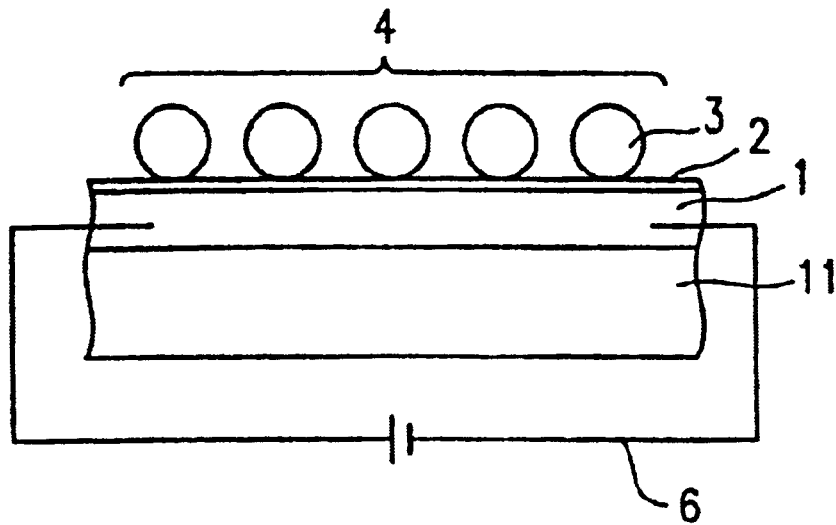

FIG.24
(a) 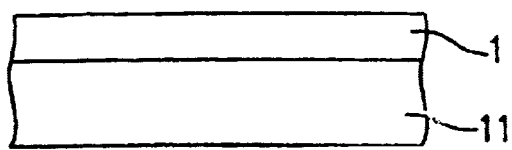
(b) 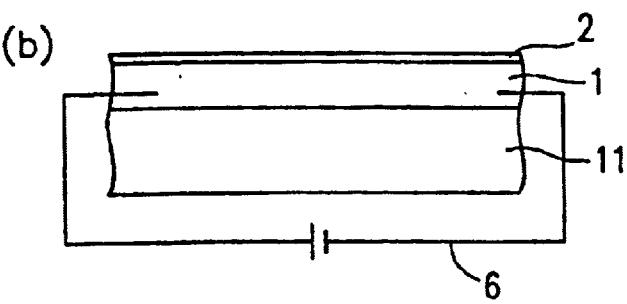
(c) 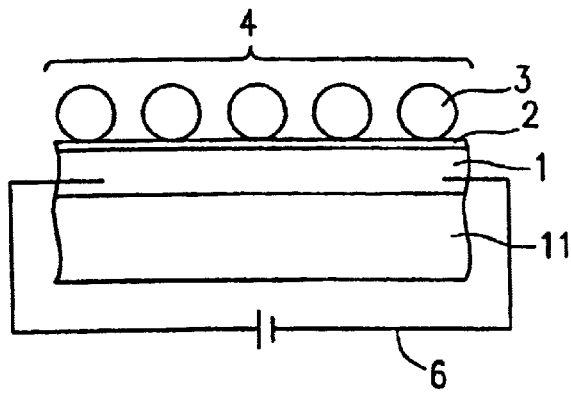
(d) 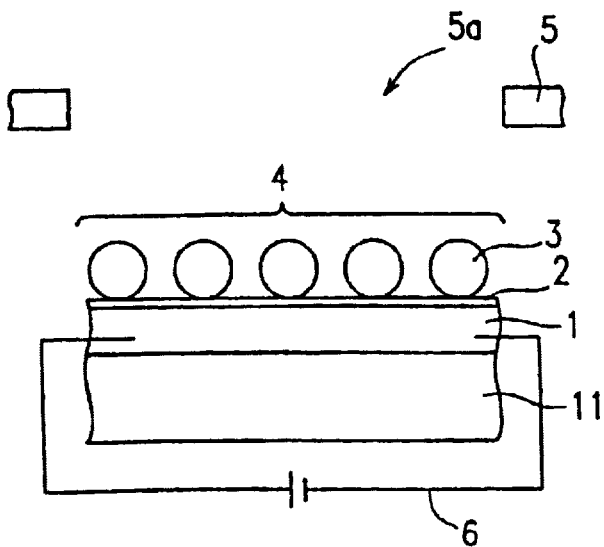

FIG.25
(a)
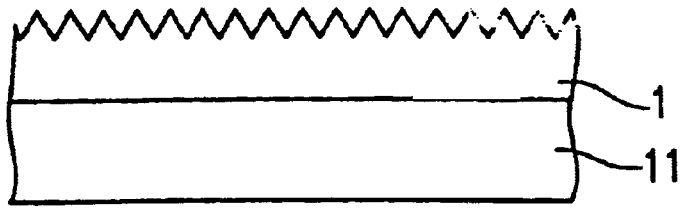
(b)
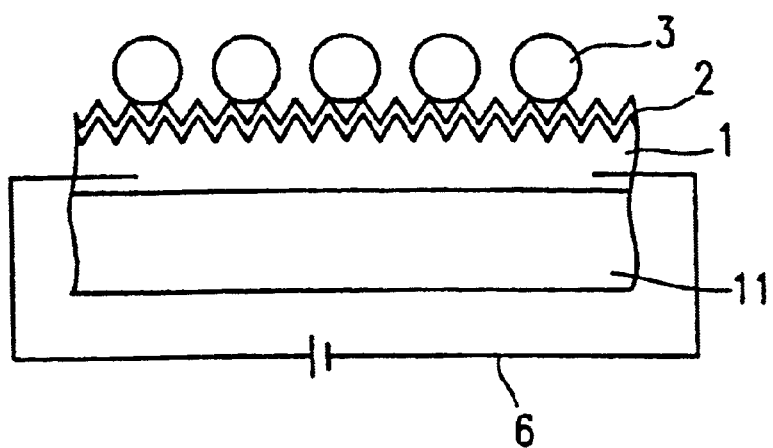
(c)
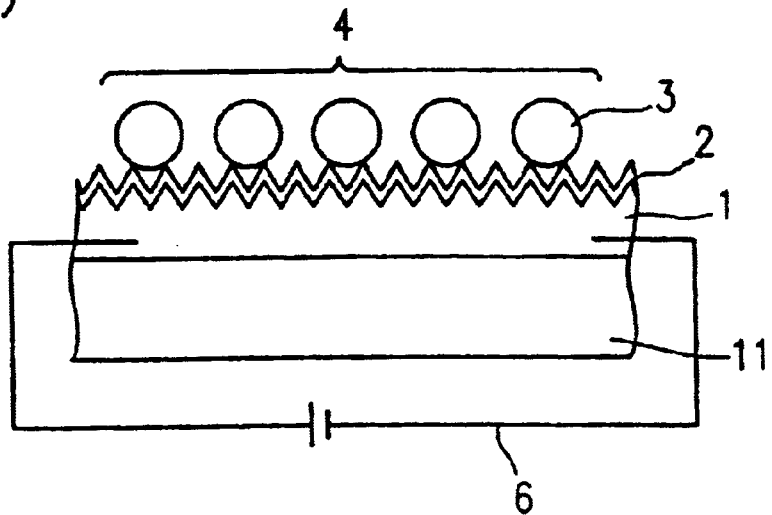

FIG.28
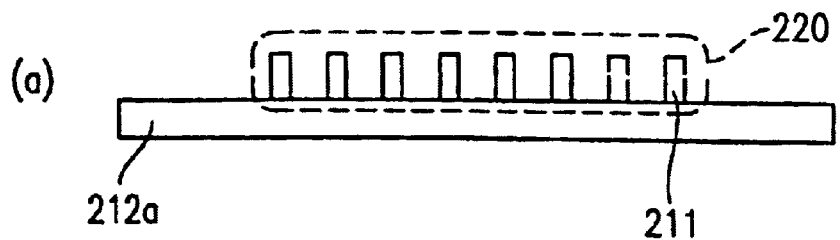
(a)
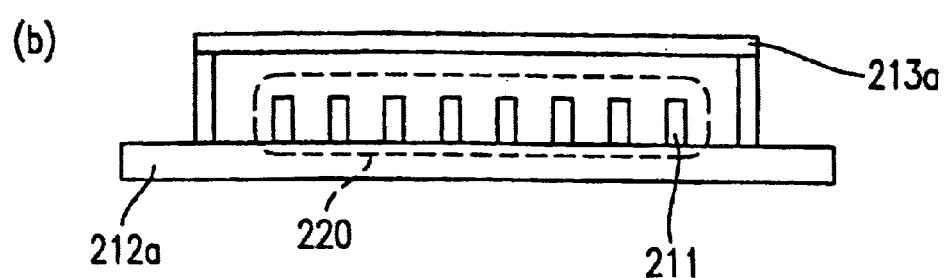
(b)
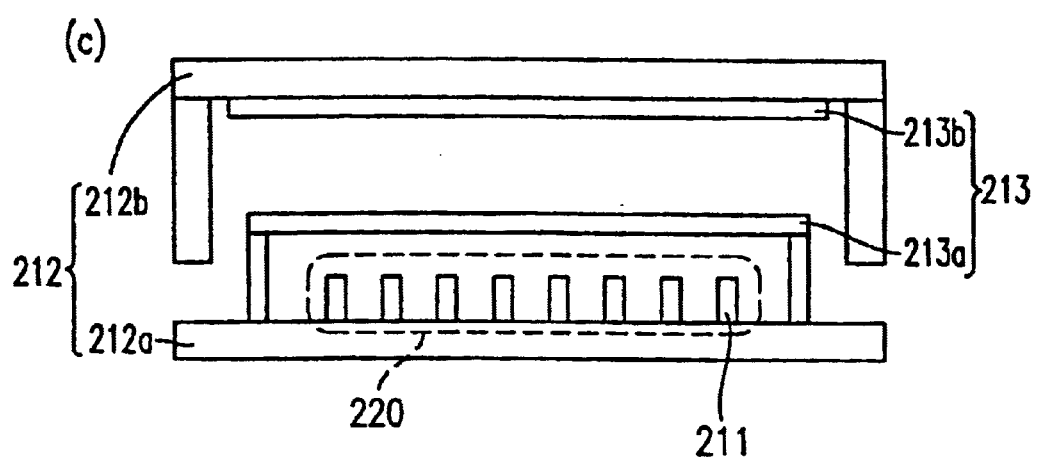
(c)
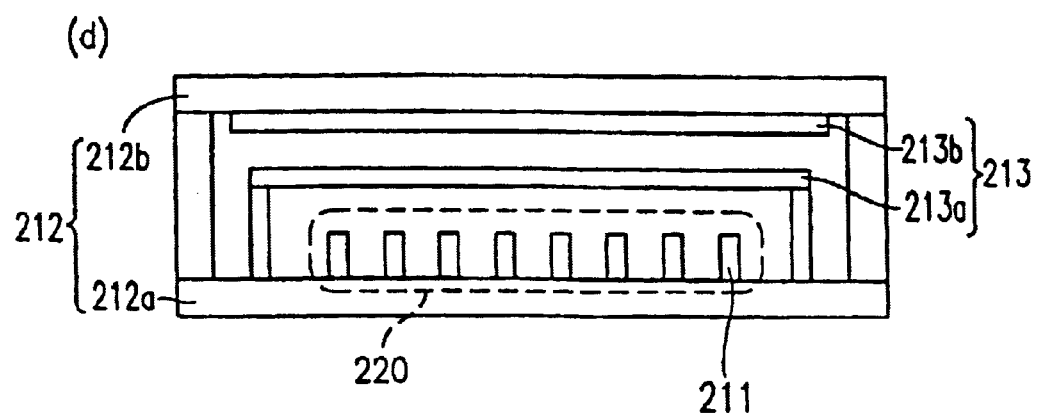
(d)

ELECTRON EMITTING DEVICE, METHOD OF PRODUCING THE SAME, AND METHOD OF DRIVING THE SAME; AND IMAGE DISPLAY COMPRISING THE ELECTRON EMITTING DEVICE AND METHOD OF PRODUCING THE SAME

This application is a U.S. National Phase Application of PCT International Application PCT/JP99/00543.

TECHNICAL FIELD

The present invention relates to an electron emitting device for emitting electrons using an appropriate material (for example, diamond particles) as an electron emitting source (emitter), a method for producing the same, and an image display apparatus including such an electron emitting device, and a method for producing such an image display apparatus. The present invention also relates to a method for driving the electron emitting device.

BACKGROUND ART

Recently, microscopic electron emitting devices have actively been developed as electron emitting sources for thin display devices and as emitters of microscopic vacuum devices capable of a high-speed operation. Conventionally used electron emitting devices are of a "heat releasing type", which applies a high voltage to a material, such as tungsten, heated to a high temperature. Recently, research and development of "cold cathode type" electron emitting devices which do not need to be heated to a high temperature and thus can emit electrons even at a low voltage have actively been performed.

Cold cathode type electron emitting devices (hereinafter, also referred to as "cold cathode devices") are required to be driven at a low voltage and a low power consumption and to stably obtain a large amount of current. As such a cold cathode type electron emitting device, a device using diamond for an electron emitting region (emitter) has recently been proposed. Such a device has been proposed utilizing the facts that diamond is a semiconductor material having a wide forbidden band (5.5 eV); has very suitable characteristics for a material for an electron emitting device such as, for example, a high hardness, a high resistance against wearing, a high heat conductivity, and chemical inactivity; and can obtain a negative electron affinity by controlling a surface state to make the energy level of the end of the conduction band lower than the energy level of the vacuum area. Especially, the characteristic of the negative electron affinity means that electrons can easily be emitted by injecting electrons into the conduction band of diamond.

An electron emitting device using diamond is disclosed in, for example, Japanese Laid-Open Publication No. 7-282715. A structure disclosed in the publication is shown as simplified in FIG. 29.

Specifically in the structure shown in FIG. 29, a conductive layer 1112 acting as an electrode is formed on a substrate 1111, and an electron emitting region 1114 formed of diamond particles 1113 is formed on the conductive layer 1112. Each of the diamond particles 1113 has a negative electron affinity as a result of a prescribed treatment. A counter electrode (not shown) is provided so as to face the electron emitting region 1114 formed of the diamond particles 1113. Electrons are emitted from each diamond particle 1113 by supplying the counter electrode with a potential.

In the conventional structure shown in FIG. 29, the electron affinity of a surface of the diamond particles 1113 is negative. Accordingly, the electrons migrating into the diamond particles 1113 from the conductive layer 1112 should be easily emitted from the diamond particles 1113. Therefore, theoretically, electrons can be emitted from the diamond particles 1113 without application of a high voltage to the counter electrode (not shown).

However, in actuality, a high voltage as in a previous structure needs to be applied to the counter electrode in order to cause electrons to emit with the structure shown in FIG. 29.

DISCLOSURE OF THE INVENTION

The present invention made in light of the above-described problem of the conventional art has objectives of providing (1) an electron emitting device capable of stably providing a large amount of current when driven at a low voltage and a method for producing the same, (2) an image display apparatus including such an electron emitting device and a method for producing the same, and (3) a method for driving such an electron emitting device.

An electron emitting device according to the present invention includes at least comprising an electron transporting member; an electron emitting member; and an electric field concentration region formed between the electron transporting member and the electron emitting member.

The electron transporting member may be a conductive layer.

The electric field concentration region may be formed of an insulating layer.

The electron emitting member may be formed of particles.

In one embodiment, the electron transporting member is a conductive layer, the electric field concentration region is formed of an insulating layer formed on the conductive layer, and the electron emitting member is formed of particles provided on the insulating layer.

In one embodiment, the electron emitting device further includes an extraction electrode provided at a prescribed position with respect to the electron emitting member and supplied with a potential for extracting electrons from the electron emitting member.

In one embodiment, a surface of the electron transporting member is roughened so as to have convex and concave portions, and the electron emitting member is provided on the roughened surface of the electron transporting member, with at least the convex portions of the convex and concave portions interposed therebetween.

In one embodiment, the electron emitting device further includes a circuit for causing an electric current to flow in the electron transporting member.

In one embodiment, the electric field concentration region is formed of an insulating layer formed on a surface of the particles forming the electron emitting member, and the particles are provided on the electron transporting member with the insulating layer interposed therebetween.

In another embodiment, the electron transporting member is a conductive layer, and the electric field concentration region is formed of an insulating layer formed on the conductive layer, and the electron emitting member is formed of particles provided so as to be partially buried in the insulating layer.

Preferably, the electric field concentration region has a thickness of 1000 Å or less.

In one embodiment, the electron emitting member is formed of a plurality of particles provided independently, out of contact with one another.

Preferably, the electron emitting member in formed of particles of a material having a negative electron affinity.

The particles may be diamond particles. For example, the diamond particles are artificial diamond particles. Alternatively, the diamond particles are diamond particles synthesized by a vapor phase technique.

Alternatively, the particles are carbon particles partially having a diamond structure.

An outermost surface layer of the diamond particles may have a termination structure bonded with hydrogen.

For example, the diamond particles are formed by being exposed to a hydrogen atmosphere of 600° C. or higher.

The diamond particles may include an impurity.

The impurity may be formed by ion implantation. Preferably, the impurity has a density of $1\times10^{13}/cm^3$ or higher.

The electron transporting member may be a conductive layer formed of a material having a small work function.

An electron emitting device according to another aspect of the invention includes at least comprising an electron injection member; an electron emitting member; and an electron transporting member formed between the electron transporting member and the electron emitting member. The electron transporting member includes an electrically insulating or highly resistive portion when supplied with a prescribed low DC voltage.

Preferably, the electron transporting member includes a portion having an electric resistance of 1 kΩcm or higher when supplied with such a weak electric field as to make a highest electric field strength in the electron transporting member 1 mV/$\mu$m or less.

The electron emitting member may include a substance having a negative electron affinity.

The electron emitting member may include a substance containing at least carbon or particles thereof. For example, the electron emitting member may include graphite particles.

In one embodiment, the electron emitting member includes at least wide bandgap semiconductor particles having a bandgap of 3.5 eV or more.

For example, the electron emitting member includes diamond particles.

In one embodiment, the electron emitting member is formed of particles, and the particles are each larger than a cube having a side of 1 nm and can be accommodated in a cube having a side of 1 mm.

In one embodiment, the electron transporting member is formed of particles or a thin film of a wide bandgap semiconductor material having a bandgap of 3.5 eV or more, and the electron emitting member is formed on a surface of the particles or the thin film of the wide bandgap semiconductor material.

In one embodiment, the electron transporting member and the electron emitting member are each formed of particles of a thin film of a diamond material formed by a vapor phase growth technique.

The electron emitting member may be a surface conductive layer of particles or a thin film of a hydrogenized diamond material.

In one embodiment, the electron transporting member and the electron emitting member are each formed of a diamond thin film, and the diamond thin film has a thickness of 10 nm or more and 10 $\mu$m or less.

In one embodiment, the electron transporting member is formed of diamond particles, and the electron emitting member is formed of diamond-containing a carbon-based thin film or particles formed on at least a part of a surface of the diamond particles forming the electron transporting member.

In one embodiment, at least one of the electron emitting member and the electron transporting member is formed of a wide bandgap semiconductor material having a bandgap of 3.5 eV or more, and the wide bandgap semiconductor material is a compound of nitrogen and at least one element of Ga, Al, In and B.

Preferably, the electron injection member and the electron transporting member are in ohmic contact with each other.

The electron transporting member includes an insulating layer having a thickness of 500 nm or less.

A method for producing an electron emitting device according to the present invention includes the steps of forming an electron transporting member on a substrate; and providing an electron emitting member in contact with the electron transporting member with an electric field concentration region interposed therebetween.

In one embodiment, the electron transporting member is a conductive layer formed on the substrate, and the electron emitting member is formed of particles provided in contact with the conductive layer with an insulating layer acting as the electric field concentration region interposed therebetween.

In one embodiment, the method further includes the step of providing an extraction electrode to be supplied with a potential for extracting electrons from the electron emitting member, the extraction electrode being provided at a prescribed position with respect to the electron emitting member.

In one embodiment, the method further includes the step of roughening a surface of the electron transporting member.

In one embodiment, the method further includes the step of providing a circuit for causing an electric current to flow in the electron transporting member.

In one embodiment, the step of providing the electron emitting member includes the steps of forming an insulating layer acting as the electric field concentration region on a conductive layer acting as the electron transporting member, and providing particles acting as the electron emitting member on the insulating layer.

In one embodiment, the step of providing the electron emitting member includes the steps of forming an insulating layer acting as the electric field concentration region on a surface of particles acting as the electron emitting member, and providing the particles on a conductive layer acting as the electron transporting member.

In one embodiment, the step of providing the electron emitting member includes the steps of causing a mixture of a liquid curable insulating substance and prescribed particles to adhere to a conductive layer acting as the electron transporting member, curing the liquid curable insulating substance, and selectively removing only a surface portion of the cured insulating substance to expose a portion of the particles included in the mixture, thereby causing the exposed portion of the particles to act as the electron emitting member.

The selective removing step can be performed by chemical etching. For example, the chemical etching is performed by a hydrogen plasma irradiation process.

In one embodiment, the step of providing the electron emitting member includes the steps of forming an insulating layer acting as the electric field concentration region on a conductive layer acting as the electron transporting member, providing the substrate having the insulating layer formed thereon in a solution containing particles dispersed therein, and applying ultrasonic vibration to the solution to cause the particles in the solution to adhere to the insulating layer. The particles adhering to the insulating layer act as the electron emitting member.

In one embodiment, the step of providing the electron emitting member includes the steps of forming an insulating layer acting as the electric field concentration region on a conductive layer acting as the electron transporting member, and applying a solution containing particles dispersed therein to the insulating layer to cause the particles to adhere to the insulating layer. The particles adhering to the insulating layer act as the electron emitting member.

In one embodiment, the step of providing the electron emitting member includes the steps of forming an insulating layer acting as the electric field concentration region on a conductive layer acting as the electron transporting member, and using an electrophoresis process using a solution containing particles dispersed therein to cause the particles to adhere to the insulating layer. The particles adhering to, the insulating layer act as the electron emitting member.

In one embodiment, the step of providing the electron emitting member includes the steps of forming an insulating layer acting as the electric field concentration region on a surface of particles acting as the electron emitting member, providing the substrate having a conductive layer acting as the electron transporting member formed thereon in a solution containing particles dispersed therein, and applying ultrasonic vibration to the solution to cause the particles in the solution to adhere to the conductive layer.

In one embodiment, the step of providing the electron emitting member includes the steps of forming an insulating layer acting as the electric field concentration region on a surface of particles acting as the electron emitting member, and applying a solution containing particles dispersed therein to the conductive layer acting as the electron transporting member to cause the particles to adhere to the insulating layer.

In one embodiment, the stop of providing the electron emitting member includes the steps of forming an insulating layer acting as the electric field concentration region on a surface of particles acting as the electron emitting member, and using an electrophoresis process using a solution containing the particles dispersed therein to cause the particles to adhere to a conductive layer acting as the electron transporting member.

In one embodiment, the step of roughening the surface of the electron transporting member includes the step of forming a conductive layer acting as the electron transporting member by a thermal spraying technique.

In one embodiment, the step of roughening the surface of the electron transporting member includes the steps of forming a flat conductive layer acting as the electron transporting member, and roughening a surface of the flat conductive layer. For example, the step of roughening a surface of the flat conductive layer is performed by blasting. Alternatively, the step of roughening a surface of the flat conductive layer is performed by chemical etching.

In one embodiment, the method further includes the step of roughening a surface of the substrate, wherein the electron transporting member is formed on the roughened surface of the substrate to roughen a surface of the electron transporting member.

In one embodiment, at least one of the electron transporting member and the electron emitting member is a diamond thin film grown by a vapor phase growth technique, the method comprising the step of distributing diamond growth nuclei having a distribution density of $1 \times 10^{10}/cm^2$ or more as a pre-vapor phase technique.

According to still another aspect of the invention, a method for driving an electron emitting device, the electron emitting device including at least an electron injection member, an electron emitting member, and an electron transporting member between the electron injection member and the electron emitting member. The electron transporting member includes an electrically insulating or highly resistive portion when supplied with a prescribed low DC voltage, the method comprising the step of applying a potential changing time-wise to the electron emitting member.

Preferably, a potential changing time-wise is applied to the electron emitting member in the state where the electron emitting member is insulated from the electron injection member in a DC manner.

In one embodiment, the potential changing time-wise is formed by superimposing a DC voltage for causing the electron emitting member to have a positive potential with respect to the electron injection member, to a prescribed AC voltage.

In one embodiment, an extraction electrode is supplied with a DC voltage, for applying an electric field to the electron emitting member through a vacuum area, the electric field being applied for causing electrons to be emitted from the electron emitting member, so that the electron injection member has a negative potential and the extraction electrode has a positive potential.

An image display apparatus according to the present invention includes at least an electron emitting source; and an image forming section for forming an image by electrons emitted from the electron emitting source. The electron emitting source includes at least a plurality of electron emitting devices. Each of the plurality of electron emitting devices has features as described above.

A method for producing an image display apparatus according to the present invention includes the steps of forming a plurality of electron emitting devices; forming an electron emitting source using the plurality of electron emitting devices and providing the electron emitting source at a prescribed position; and providing an image forming section for forming an image by electrons emitted from the electron emitting source, at a prescribed positional relationship with the electron emitting source. Each of the plurality of electron emitting devices is formed by a method according to the present invention having features as described above.

BRIEF DESCRIPTION OF THE DRAWINGS

FIG. 1E is a schematic cross-sectional view of another modified structure of an electron emitting device in the first example according to the present invention.

FIG. 9 is a schematic cross-sectional view of an electron emitting device in a seventh example according to the present invention.

FIG. 10 is a schematic cross-sectional view of an electron emitting device in an eighth example according to the present invention.

FIGS. 19(a) through (o) are cross-sectional views schematically illustrating steps for producing the electron emitting device shown in FIG. 1A.

FIGS. 20(a) through (d) are cross-sectional views schematically illustrating steps for producing the electron emitting device shown in FIG. 4.

FIGS. 21(a) through (o) are cross-sectional views schematically illustrating steps for producing the electron emitting device shown in FIG. 5A.

FIGS. 22(a) through (d) are cross-sectional views schematically illustrating steps for producing the electron emitting device shown in FIG. 6A.

FIGS. 23(a) through (o) are cross-sectional views schematically illustrating steps for producing the electron emitting device shown in FIG. 7.

FIGS. 24(a) through (d) are cross-sectional views schematically illustrating steps for producing the electron emitting device shown in FIG. 5.

FIGS. 25(a) through (o) are cross-sectional views schematically illustrating steps for producing the electron emitting device shown in FIG. 9.

FIGS. 28(a) through (d) are cross-sectional views schematically illustrating steps for producing the image display apparatus shown in FIG. 27.

BEST MODE FOR CARRYING OUT THE INVENTION

Figure 29:
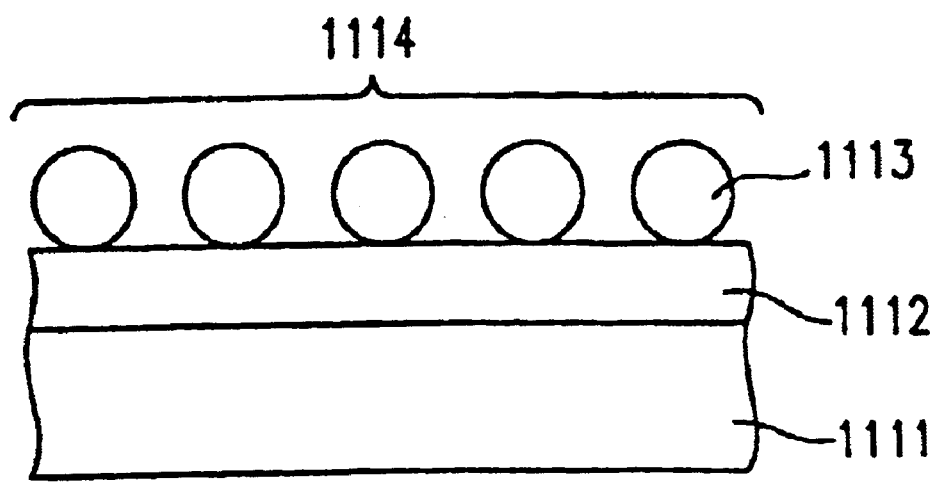
FIG. 29 is a schematic cross-sectional view of a structure of a conventional electron emitting device.

According to the studies of the present inventors, the reason that a high voltage needs to be applied to the counter electrode, as described above, in order to actually cause electrons to emit from the electron emitting device having a conventional structure shown in FIG. 29 is that an electron barrier exists at an interface between the conductive layer 1112 and the diamond particles 1113.

When the conductive layer 1111 and the diamond particles 1113 form an ohmic contact, the above-described problem does not occur. However, it is generally difficult to form an ohmic contact with diamond due to the material characteristics of the conductive layer and the diamond, and in actuality a Schottky contact is formed. Accordingly, in order to inject the electrons from the conductive layer 1112 to the diamond particles 1113, the electrons need to migrate over the electron barrier at the interface between the conductive layer 1112 and the diamond particles 1113. Therefore, the electrons need to be supplied with a sufficient amount of energy by application of a high voltage to the counter electrode.

Due to the above-described reason, it is difficult to efficiently inject the electrons from the conductive layer 1112 to the diamond particles 1113 with the conventional structure shown in FIG. 29. Thus, the electrons cannot be obtained in a sufficient amount.

Hereinafter, several practical examples of the present invention made based on the studies by the present inventors will be described with reference to the attached drawings.

EXAMPLE 1

Figure 1A:
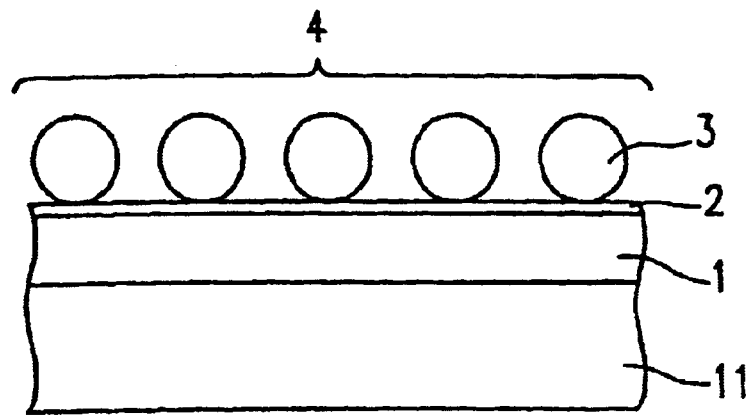
FIG. 1A is a schematic cross-sectional view of an electron emitting device in a first example according to the present invention.

FIG. 1A shows a cross-sectional view of an electron emitting device in a first example according to the present invention. The structure shown in FIG. 1A is generally referred to as a diode structure.

With reference to FIG. 1A, an electron transporting member 1 is formed on a substrate 11, and electron emitting members 3 forming an electron emitting region 4 are provided on the electron transporting member 1 with an electric field concentration region 2 interposed therebetween. The electron emitting members 3 can be formed of a conductive layer 1, the electron emitting members 3 can be formed of particles, and the electric field concentration region 2 can be formed of an insulating layer 2, but the materials are not specifically limited to these materials.

Figure 1B:
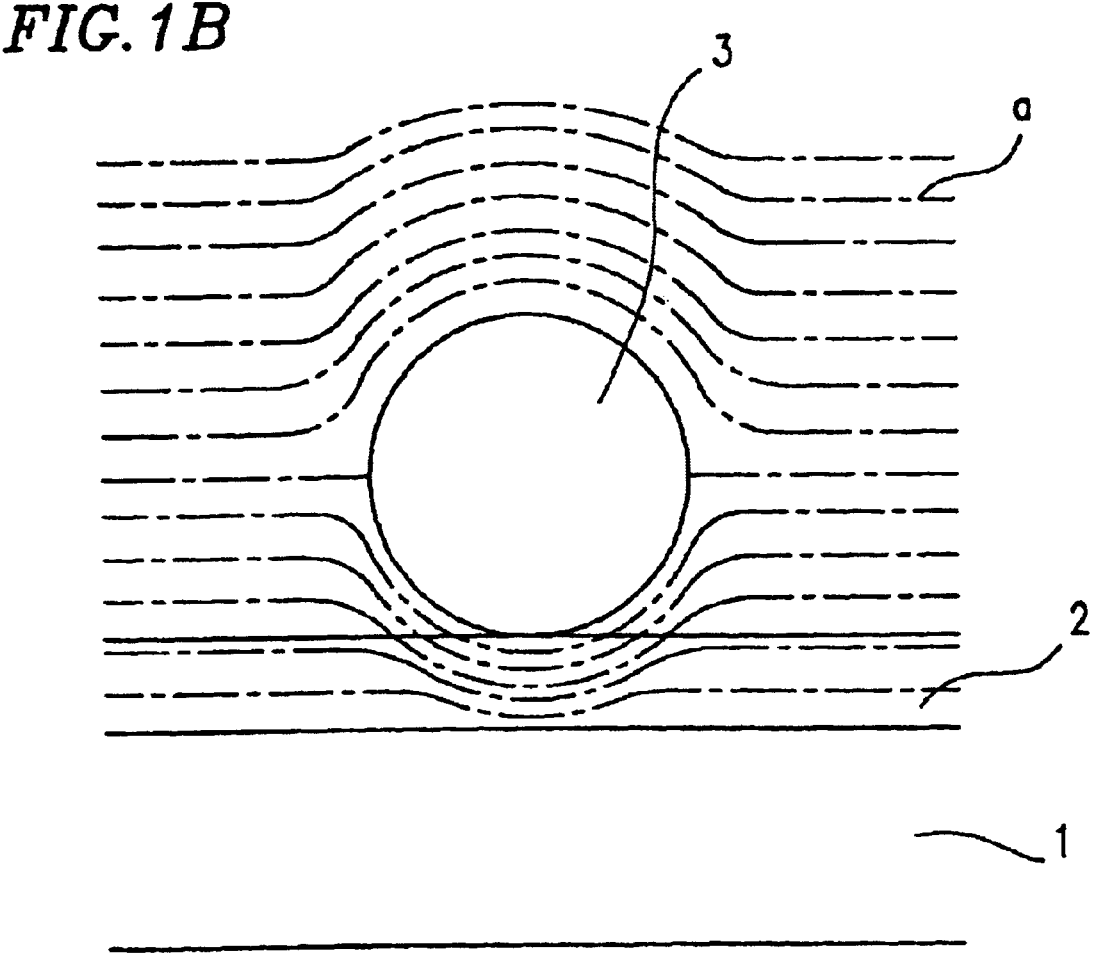
FIG. 1B is a schematic view of an electric field (equipotential lines) in the structure shown in FIG. 1A when an electric field concentration region exists.
Figure 1C:
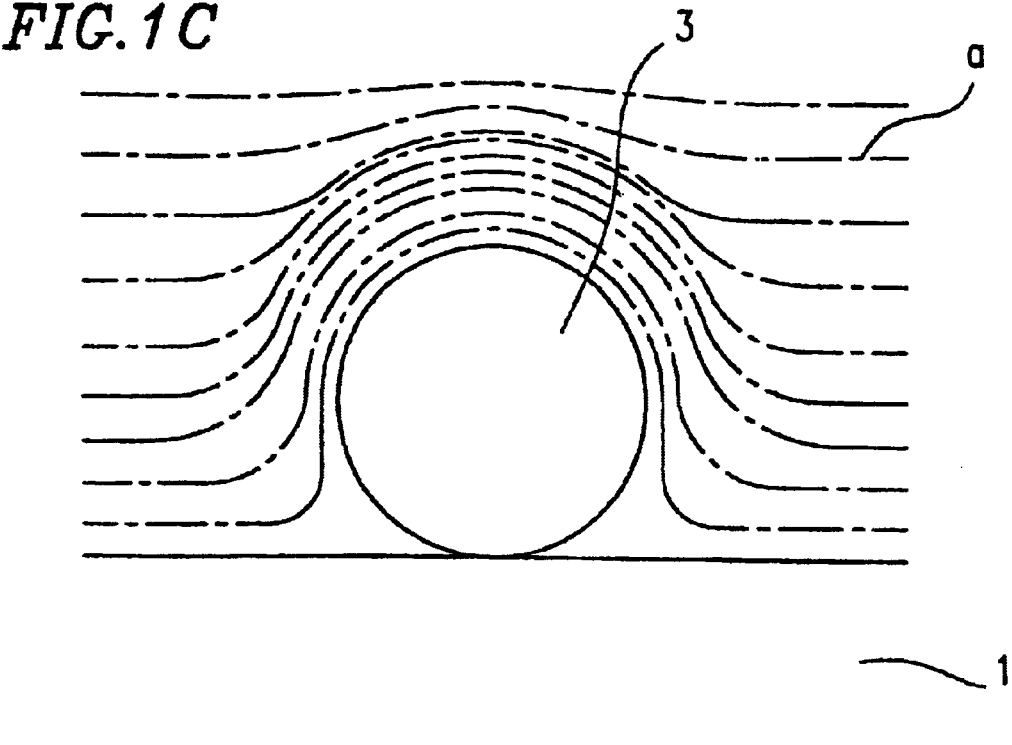
FIG. 1C is a schematic view of an electric field (equipotential lines) in the structure shown in FIG. 1A when an electric field concentration region does not exist.

When a voltage is applied to an electrode (not shown) facing the electron emitting members 3, an electric field is generated between the electron transporting member 1 and the electrode not shown. The level of the electric field is determined by a voltage and a distance between the electron transporting member 1 and the electrode. In the case where, for example, the particle-like electron emitting members 3 exist, equipotential lines a are generated while avoiding the electron emitting members 3. In the case where, as shown in FIG. 1C, each electron emitting member 3 is provided directly on the electron transporting member 1 without the electric field concentration region 2 existing therebetween the electric field (equipotential lines) concentrates only at one location, i.e. between the electron emitting member 3 and the electrode (not shown) facing the electron emitting member 3 (in the vicinity of a tip of the electron emitting member 3). In the case where, as shown in FIG. 1B, the electric field concentration region 2 is provided, the electric field (equipotential lines) concentrates in the location between the electron emitting member 3 and the electrode (not shown) facing the electron emitting member 3 and also in the electric field concentration region 2 between the electron emitting member 3 and the electron transporting member 1. The existence of the electric field concentrated in the electric field concentration region 2 facilitates the injection of electrons from the electron transporting member 1 to the electron emitting members 3.

A process for electron emission with such a structure will be described below.

The electric field-concentration region 2 has a thickness which is sufficiently smaller than the distance between the electron emitting members 3 and a counter electrode (not shown). Accordingly, the electric field concentrated in the electric field concentration region 2 is stronger than the electric field concentrated in the vicinity of the tips of the electron emitting members 3. Therefore the electrons first tunnel through the electric field concentration region 2 and thus are injected into the electron emitting members 3 from the electron transporting member 1.

In the state where a sufficient amount of electrons are injected, the electron emitting members 3 has an equal potential with that of the electron transporting member 1. In terms of potential, the electron emitting members 3 are like projections existing on the electron transporting member 1. At this point, the concentration of the electric field in the electric field concentration region 2 disappears.

Then, the electrons are emitted from the electron emitting members 3 toward the counter electrode by the electric field concentration caused between the electron emitting members 3 and the counter electrode (not shown). At this point, the electron emitting device is returned to the initial state.

Then, again, the electric field is concentrated in two locations, i.e., in the electric field concentration region 2, and between the electron emitting members 3 and the counter electrode (in the vicinity of the tips of the electron emitting members 3).

By repeating the above-described operation, the electrons are transferred from the electron transporting member 1.

Figure 1D:
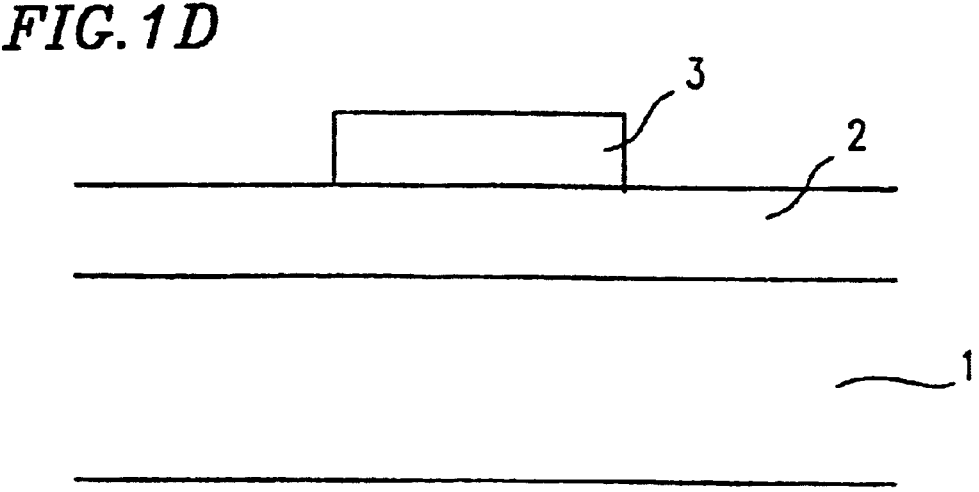
FIG. 1D is a schematic cross-sectional view of a modified structure of an electron emitting device in the first example according to the present invention.

In the above description, the electron emitting members 3 are particle-like, in order to improve the degree of electric field concentration between the electron emitting members 3 and the counter electrode for causing the electrons to be emitted from the electron emitting members 3 to the counter electrode. However, the electron emitting members 3 do not need to be particle-like in order to achieve the objective of the present invention of improving the efficiency of electron injection from the electron transporting member 1 to the electron emitting members 3. For example, as shown in FIG. 1D, a layer-like electron emitting member, (electron emitting layer) 3 can be provided on the electron transporting member 1 with the electric field concentration region 2 interposed therebetween. An effect similar to that of the above-described structure can be provided.

The electric field concentration region 2 does not need to be formed of an insulating material as mentioned above. For example, as shown in FIG. 1E, a very narrow gap can be formed between the electron transporting member 1 and the electron emitting members 3. The gap, i.e., a vacuum space area 2 acts as the electric field concentration region 2. Thus, an effect similar to that of the above-described structure can be provided.

In any of the structures, the electrons in the electric field concentration region 2 migrate by the tunneling effect. Accordingly, the electric field concentration region (for example, insulating layer) 2 preferably has a thickness allowing tunneling of the electrons, for example, about 1000 Å or less.

Figure 2:
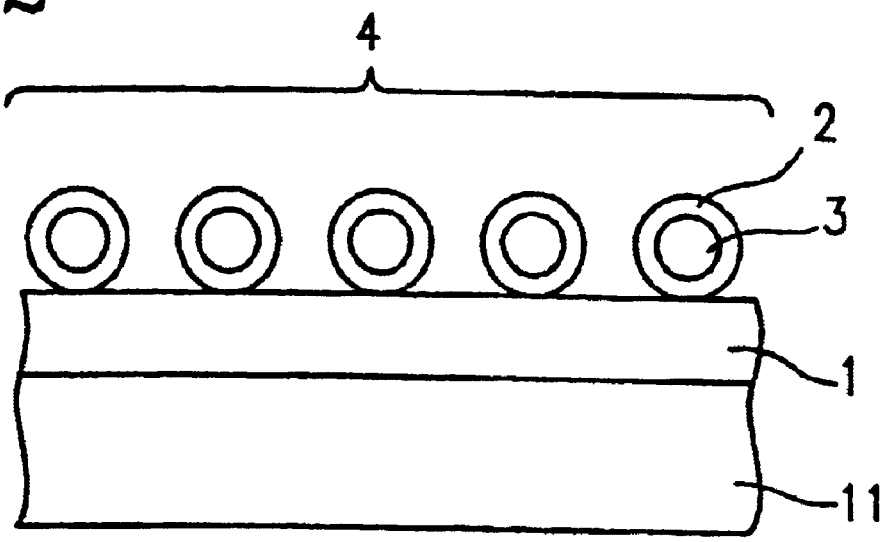
FIG. 2 is a schematic cross-sectional view of still another modified structure of an electron emitting device in the first example according to the present invention.
Figure 3:
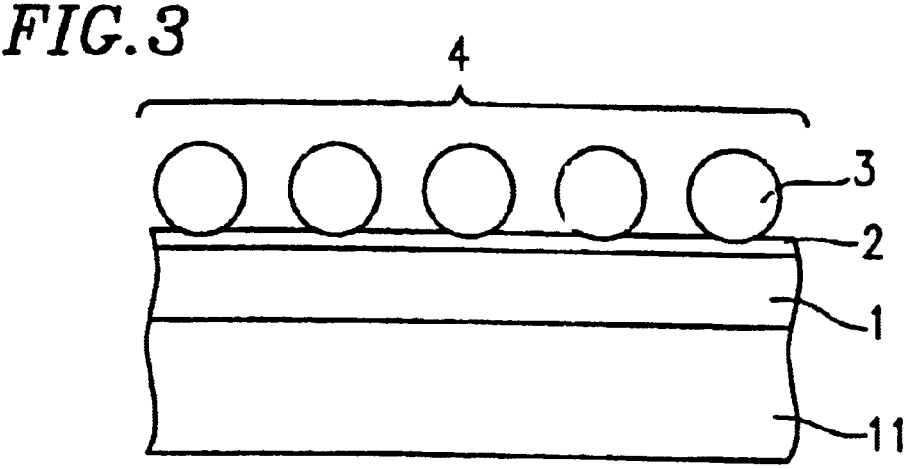
FIG. 3 is a schematic cross-sectional view of still another modified structure of an electron emitting device in the first example according to the present invention.

In the example shown in FIG. 1A, the particles 3 as the electron emitting members 3 forming the electron emitting region 4 adhere to and are provided on the conductive layer 1 as the electron transporting member 1, with the insulating layer 2 as the electric field concentration region 2 interposed therebetween. However, the structure for realizing the present invention is not limited to this structure. For example, as shown in FIG. 2, the particles 3 having an insulating layer 2 on a surface thereof can adhere to and be provided on the conductive layer 1. Alternatively, as shown in FIG. 3, the particles 3 can be partially buried in the insulating layer 2 formed on the conductive layer 1.

A current discharged from the electron emitting region 4 is a total of the electrons emitted from the particles 3. Accordingly, the particles 3 forming the electron emitting region 4 preferably adhere independently, i.e., out of contact with one another, is order to obtain a large amount of current which is uniform and stable time-wise and space-wise.

Especially when diamond is used for the particles 3, the substance characteristics of the particles 3 are stabilized and thus the time-wise stability of electron emission is further enhanced. Types of industrially usable diamond include, for example, artificial diamond synthesized by a vapor phase synthesis technique. It is generally considered that the electron affinity of diamond is made negative by hydrogen-terminating the surface of diamond. Thus, the particles 3 formed of diamond and having a surface thereof hydrogen-terminated can further enhance the effect of the present invention. The diamond particles can be hydrogen-terminated by, for example, exposing the diamond particles to a hydrogen atmosphere of 600° C. or higher or by exposing the diamond particles to a hydrogen plasma.

When carbon particles partially having a diamond structure are used as the particles 3, a similar effect can be provided. In this case also, the effect of the present invention can be enhanced by hydrogen-termination. The hydrogen-termination can be performed in a manner similar to that in the case of the diamond particles.

In the case where the diamond particles 3 or the carbon particles 3 partially having a diamond structure contain an impurity therein, the electric resistance of the particles is reduced and thus an effect of increasing the current amount can be provided. Accordingly, the effect of the present invention can be enhanced. The impurity can be artificially controlled so as to exist inside the particles 3 by a technique of ion implantation or the like. The density of the impurity is preferably, for example, $1 \times 10^{13}/cm^3$ or higher.

The conductive layer 1, which acts as an electrode for supplying the particles 3 forming the electron emitting region a with electrons, can be a thin or thick film formed of an arbitrary conductive material such as, for example, usual metals. The effect of the invention can clearly be obtained regardless of whether the conductive layer 1 has a single layer structure or a multiple layer structure. When permitted by the structure of the electron emitting device, the substrate 11 can act as the conductive layer 1.

A specific exemplary structure and a method for producing the same in the first example according to the present invention will be described below.

First, as shown in FIG. 19(a), the conductive layer 1 is formed on a surface of the Si substrate 11. Next, as shown in FIG. 19(b), an $SiO_2$ layer 2 having a thickness of 500 Å is formed on the conductive layer 1. Then, as shown in FIG. 19(b), diamond particles 3 having an average particle diameter of 10 μm are caused to adhere to the $SiO_2$ layer 2, thereby forming the electron emitting region 4.

The diamond particles 3 are caused to adhere by, for example, mixing the diamond particles 3 in a vehicle and performing spin-coating; immersing the substrate 11 in FIG. 19(b) in a solution containing the particles 3 dispersed therein and applying ultrasonic vibration to the solution so that the particles 3 in the solution are caused to adhere to the substrate 11; or performing electrophoresis. By any of the techniques, the particles 3 can be caused to adhere to the substrate 11 while being out of contact with one another by appropriately setting the adhering conditions.

In this state, a counter electrode was provided 1 mm away from the Si substrate 11 and a voltage was applied to the counter electrode. An emission current of 1 $\mu m/cm^2$ or more was obtained at a voltage of about 3 kV.

Alternatively, as shown in FIG. 2, Cu particles 3 having the insulating layer 2 formed of an oxide layer on the surface thereof can adhere to the conductive layer Still alternatively, as shown in FIG. 3, after an oxide layer 2 is formed on a surface of an indium layer 1 as the conductive layer 1, the diamond particles 3 can be buried in the oxide layer 2 so as not to destroy the oxide layer 2. According to a still alternative technique, the particles are mixed with a liquid curable insulating substance, and the mixture is caused to adhere to the conductive layer and cured. Then, the insulating substance at a surface and the vicinity thereof is selectively removed to expose a part of the particles. A similar effect is provided.

By any of the above-mentioned processes (and structures obtained by the processes), the plurality of particles 3 are caused to adhere to the conductive layer 1 while being out of contact with one another. As a result, each of the particles 3 acts as an electron emitting source (emitter). Therefore, the amount of current (electrons) emitted from the electron emitting region 4 is the total amount of electrons emitted from all of the particles 3. The resultant electron emitting element can provide a large amount of current.

The diamond used above is artificial diamond synthesized by, for example, a vapor phase synthesis technique. The diamond was exposed to a hydrogen atmosphere of 600° C. and the surface thereof was hydrogen-terminated. A reduction in the voltage at which the electron emission starts was observed. A similar effect was observed by exposing the diamond particles to a hydrogen plasma.

Black diamond particles, which are generally considered to be poor in quality, are actually carbon particles partially having a diamond structure. Even when the black diamond particles were used as the particles 3, a similar effect could be provided. In this case, by hydrogen-terminating the surface of the black diamond particles in a process similar to that described above, a similar effect to that obtained in the case of the diamond particles ways provided.

The diamond particles or the carbon particles partially having a diamond structure contain an impurity therein. Therefore, the electric resistance thereof was reduced, and as a result an increase in the amount of current was observed. Alternatively, by artificially controlling the impurity to exist inside the particles 3 by ion implantation, the electron emission characteristics can be controlled. For example, by implanting boron as an impurity at a density of $1 \times 10^{13}/cm^3$ or higher, an improvement in the emission characteristics was observed.

The electron transporting member 1 in the above-described structure is preferably formed of a material having a minimum possible work function for the following reason. The electrons are extracted from the electron transporting member 1 and injected into the electron emitting members 3 by an electric field concentration generated in the electric field concentration region 2. Therefore, as the work function of the material forming the electron transporting member 1 is smaller, the electrons can be more efficiently extracted (injected into the electron emitting members 3). The other examples of the present invention having similar structures may have this feature.

EXAMPLE 2

Figure 4:
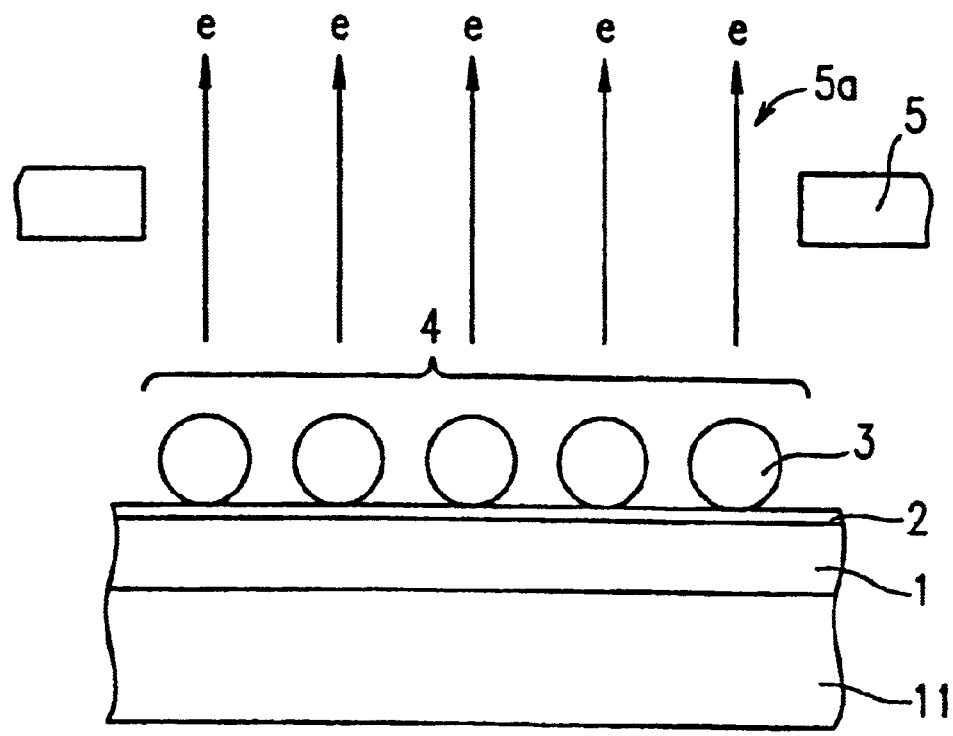
FIG. 4 is a schematic cross-sectional view of an electron emitting device in a second example according to the present invention.

FIG. 4 shows a cross-sectional view of an electron emitting device in a second example according to the present invention.

With the structure shown in FIG. 4, a conductive layer (electron transporting member) 1 is formed on a substrate 11. An insulating layer (electric field concentration region) 2 is formed on the conductive layer 1. Particles (electron emitting members) 3 adhere to the insulating layer 2 to form an electron emitting region 4. An extraction electrode 5 having an opening 5a at a position corresponding to the electron emitting region 4 is provided with a prescribed distance from the electron emitting region The structure shown in FIG. 4 is generally referred to as a triode structure. By applying a voltage to the extraction electrode 5, an electric field is concentrated on a surface of the electron emitting region 4 to extract electrons e and to cause the electrons e to pass through the opening 5a. Thus, the electrons e are extracted. Although having a slightly more complicated structure than the structure of the diode system in the first example, the electron emitting device of the triode system allows a voltage applied to the extraction electrode 5 for extracting the electrons e to be set independently from a voltage applied to a counter electrode (not shown) to cause a fluorescent body (not shown) to emit light. Accordingly, the extraction electrode 5 can be provided in the vicinity of the electron emitting region 4, and as a result, the electrons e can be extracted at a lower voltage.

The shape of the opening 5a provided in the extraction electrode 5 is not limited to any specific shape, but can be any of various shapes including circular, rectangular, and polygonal shapes. Alternatively, the opening can be slit-like. For simplicity, the cross-sectional view of FIG. 4 does not show an end of the opening, which is seen when the opening 5a is circular or polygonal. This is applied to any other similar figures of the present invention.

A specific exemplary structure and a method for producing the same in the second example according to the present invention will be described below.

First, as shown in FIG. 20(a), the conductive layer 1 is formed on a surface of an Si substrate 11. Next, as shown in FIG. 20(b), an $SiO_2$ layer 3 having a thickness of 500 Å is formed on the conductive layer 1. Then, as shown in FIG. 20(b), diamond particles 3 having an average particle diameter of 10 μm are caused to adhere to the $SiO_2$ layer 2, thereby forming the electron emitting region 4.

The diamond particles 3 are caused to adhere by, for example, mixing the diamond particles 3 in a vehicle and performing spin-coating: immersing the substrate 11 in FIG. 20(b) in a solution containing the particles 3 dispersed therein and applying ultrasonic vibration to the solution so that the particles 3 in the solution are caused to adhere to the substrate 11; or performing electrophoresis. By any of the techniques, the particles 3 can be caused to adhere to the substrate 11 while being out of contact with one another by appropriately setting the adhering conditions.

By any of the above-mentioned processes land structures obtained by the processes), the plurality of particles 3 are caused to adhere to the conductive layer 1 while being out of contact with one another. As a result, each of the particles 3 acts as an electron emitting source (emitter). Therefore, the amount of current (electrons) emitted from the electron emitting region 4 is the total amount of electrons emitted from all of the particles 3. The resultant electron emitting element can provide a large amount of current.

The extraction electrode 5 having the opening 5a is formed of a thin plate of an appropriate metal material in this state. Then, as shown in FIG. 20(d), the extraction electrode 5 is located with a distance of 1 mm from the electron emitting region 4 so that the opening 5a is located at a position corresponding to the electron emitting region 4. When a voltage was applied to the extraction electrode 5, an emission current of 1 $\mu A/cm^2$ or more was obtained at a voltage of about 3 kV.

The particles 3 forming the electron emitting region 4 can be caused to adhere after the extraction electrode 5 having the opening 5a is located at a prescribed position. It is necessary, in that case, to prevent the adherence of the particles 3 to the extraction electrode 5.

In the structure of this example, a voltage can be applied to an anode electrode (not shown) independently from the voltage applied for extracting the electrons e. For example, an image display having an improved luminance was obtained by applying a voltage of 10 kV to the anode electrode.

The structure of this example provides an effect similar to that of the first example by the adherence of the particles (electron emitting members) 3 forming the electron emitting region 4 to the conductive layer (electron transporting member) 1 with the insulating layer (electric field concentration region) 2 interposed therebetween. The practical materials and modifications of the insulating layer 2, the particles 3 and the other components, the resultant effects, the electron emitting mechanism and the like of the structure of this example are similar to those in the first example.

The structure of this example is not limited to the structure shown in FIG. 4 in which the particles 3 or an aggregate a of the particles 3 as the electron emitting members 3 are provided on the insulating layer 3 which is formed on the conductive layer 1. For example, the particles 3 having the insulating layer 2 formed on a surface thereof can be provided on the conductive layer 1, or the particles 3 can be partially buried in the insulating layer 2 formed on the conductive layer 1, as in the first example.

EXAMPLE 3

Figure 5A:
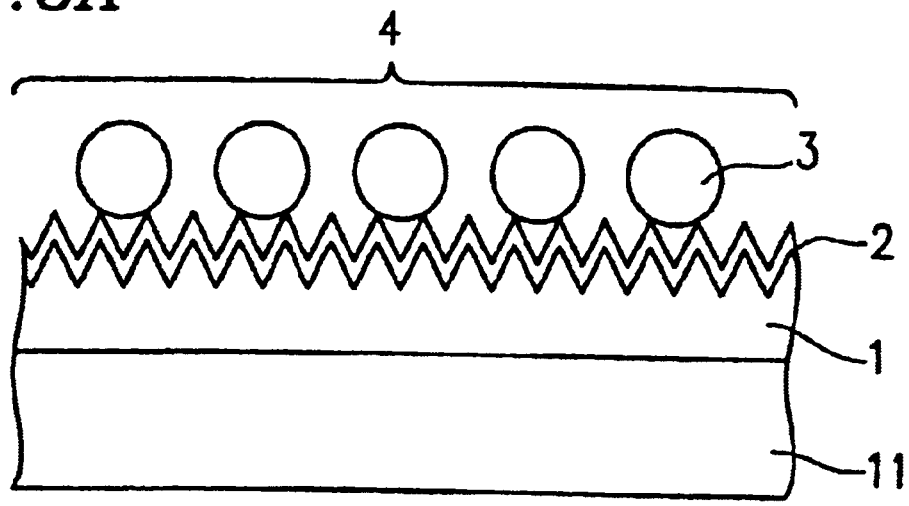
FIG. 5A is a schematic cross-sectional view of an electron emitting device in a third example according to the present invention.

FIG. 5A shows a cross-sectional view of an electron emitting device in a third example according to the present invention.

With the structure shown in FIG. 5A, a conductive layer (electron transporting member) 1 is formed on a substrate 11. A surface of the conductive layer 1 is roughened to have convex and concave portions. An insulating layer (electric field concentration region) 2 is formed along the convex and concave portions. Particles (electron emitting members) 3 adhere to the insulating layer 2 so that each of the particles 3 contact at least one of the convex portions, thus forming the electron emitting region 4.

The structure shown in FIG. 5A is also generally referred to as a diode structure. Especially in the structure shown in FIG. 5A, the particles 3 forming the electron emitting region 4 adhere to the conductive layer 1 having the surface roughened with the insulating layer 2 interposed therebetween. Therefore, the electric field is more concentrated between the conductive layer 1 and the particles 3 than in the structure in the first example in which the particles 3 and the conductive layer 1 are in contact with each other in a planer manner with the insulating layer 2 interposed therebetween. As a result, the effect of electric field concentration is provided by the electric field concentration region 2 and also by the convex and concave portions. Since the injection of the electrons to the particles 3 is easier, electrons e can be emitted at a lower applied voltage.

A specific exemplary structure and a method for producing the same in the third example according to the present invention will be described below.

First, as shown in FIG. 21(a), the conductive layer 1 having the surface roughened is formed on an Si substrate 11.

An exemplary technique for roughening the surface of the conductive layer 1 is forming the conductive layer 1 by thermal spraying. The size of the convex and concave portions (surface roughness) obtained in this manner is controllable by adjusting the thermal spraying conditions. A surface roughness of about 10 μm can be obtained at the maximum. Since thermal spraying is not a vacuum process and has a feature of forming a film at atmospheric pressure, the cost for forming the conductive layer 1 can be reduced.

Alternatively, it is possible to form the conductive layer 1 to have a flat surface and then roughen the surface by sand blasting. The sand blasting can form sharp projections at the surface of the conductive layer 1.

It is also possible to form the conductive layer 1 to have a flat surf ace and then roughen the surface by chemical etching. When, for example, wet etching is used, convex and concave portions having a surface roughness of about 2 μm can be formed by spraying the surface of the conductive layer 1 with a prescribed etchant.

Still alternatively, the convex and concave portions can be formed at the surface of the conductive layer 1 by first roughening the surface of the substrate 11 and then forming the conductive layer 1 on the roughened surface. The surface of the substrate 1 can be roughened by the above-mentioned sand blasting or etching.

Then, as shown in FIG. 21(b), an $SiO_2$ layer 2 having a thickness of 500 Å is formed on the resultant convex and concave portions of the conductive layer 1. Then, as shown in FIG. 21(c), diamond particles 3 having an average particle diameter of 10 μm are caused to adhere to the $SiO_2$ layer 2, thereby forming the electron emitting region 4.

The diamond particles 3 are caused to adhere by, for example, mixing the diamond particles 3 in a vehicle and performing spin-coating; immersing the substrate 11 in FIG. 21(b) in a solution containing the particles 3 dispersed therein and applying ultrasonic vibration to the solution so that the particles 3 in the solution are caused to adhere to the substrate 11; or performing electrophoresis. By any of the techniques, the particles 3 can be caused to adhere to the substrate 11 while being out of contact with one another by appropriately setting the adhering conditions.

By any of the above-mentioned processes (and structures obtained by the processes), the plurality of particles 3 are caused to adhere to the conductive layer 1 while being out of contact with one another. As a result, each of the particles 3 acts as an electron emitting source (emitter). Therefore, the amount of current (electrons) emitted from the electron emitting region 4 is the total amount of electrons emitted from all of the particles 3. The resultant electron emitting element can provide a large amount of current.

In this state, a counter electrode s was provided 1 mm away from the substrate 11 and a voltage was applied to the counter electrode 5. An emission current of 1 μa/cm² or more was obtained at a voltage of about 2 kV.

The practical materials and modifications of the, conductive layer (electron transporting member) 1, insulating layer (electric field concentration region) 2, the particles (electron emitting member) 3 and the other components, the resultant effects, the electron emitting mechanism and the like of the structure of this example are similar to those in the first example.

The structure of this example is not limited to the structure shown in FIG. 5A in which the particles 3 as the electron emitting members 3 are provided on the insulating layer 2 which is formed on the conductive layer 1 having a surface having convex and concave portions. For example, the particles 3 having the insulating layer 2 formed on a surface thereof can be provided on the conductive layer 1 having a surface having convex and concave portions, or the particles 3 can be partially buried in the insulating layer 2 formed on the conductive layer 1 having a surface having convex and concave portions, as in the previous examples.

Instead of the particle type electron emitting members 3, a layer type (i.e., having a layer structure) electron emitting member 3 can be provided on the conductive layer 1 having a surface having convex and concave portions with the insulating layer 2 interposed therebetween. A similar effect can be provided.

Figure 5B:
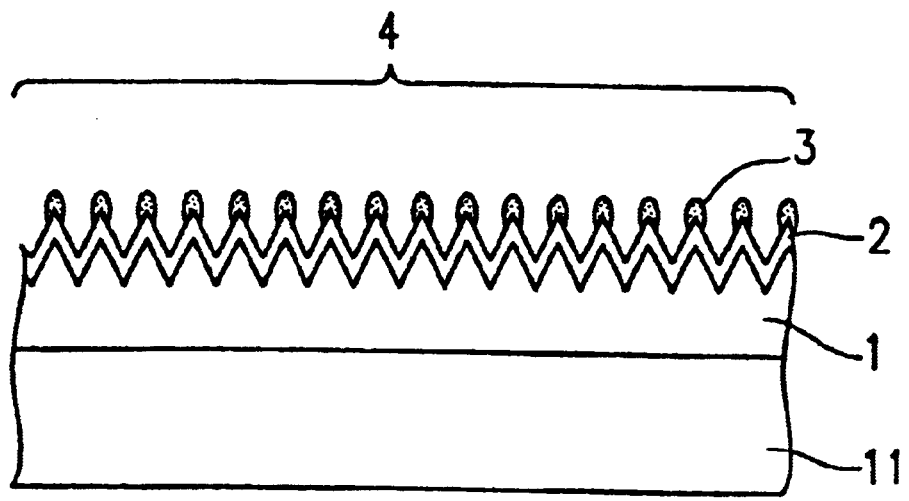
FIG. 5B is a schematic cross-sectional view of a modified structure of an electron emitting device in the third example according to the present invention.

As shown in FIG. 5B, the electron emitting layer 3 can be provided only on tops of the convex portions of the conductive layer 1 having a surface having convex and concave portions the insulating layer 2 interposed therebetween. This structure can provide an effect similar to that of the structure shown in FIG. 5A.

EXAMPLE 4

Figure 6A:
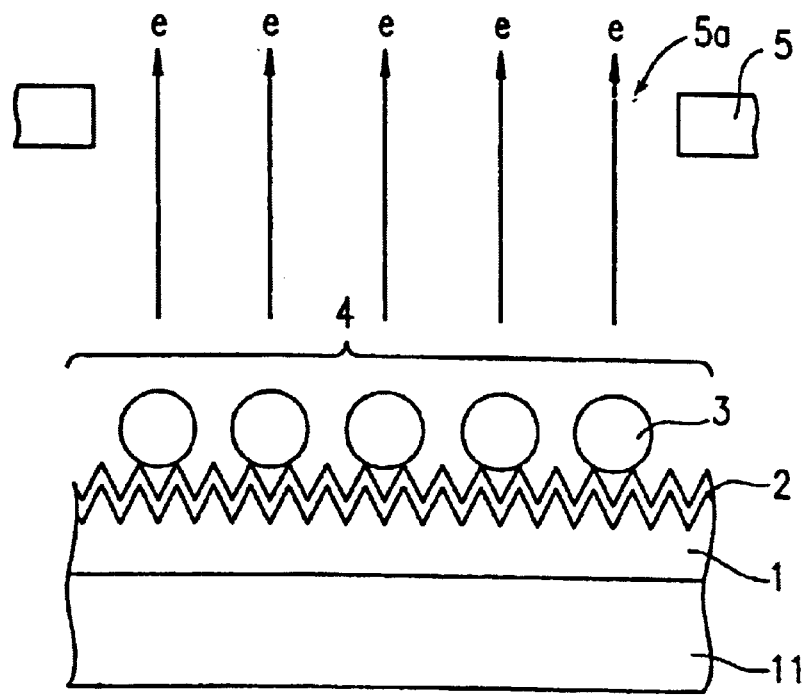
FIG. 6A is a schematic cross-sectional view of an electron emitting device in a fourth example according to the present invention.

FIG. 6A shows a cross-sectional view of an electron emitting device in a fourth example according to the present invention.

With the structure shown in FIG. 6A, a conductive layer (electron transporting member) 1 is formed on a substrate 11. A surface of the conductive layer 1 is roughened to have convex and concave portions. An insulating layer (electric field concentration region) 2 is formed along the convex and concave portions. Particles (electron emitting members) 3 adhere to the insulating layer 2 so that each of the particles 3 contact a plurality of convex portions, thus forming the electron emitting region 4. An extraction electrode 5 having an opening 5a at a position corresponding to the electron emitting region 4 is provided with a prescribed distance from the electron emitting region 4.

The structure shown in FIG. 5A is generally referred to as a triode structure. By applying a voltage to the extraction electrode 5, an electric field is concentrated on a surface of the electron emitting region 4 to extract electrons e and to cause the electrons e to pass through the opening 5a. Thus, the electrons e are extracted. Although having a slightly more complicated structure than the structure of the diode system in the third example, the electron emitting device of the triode system allows a voltage applied to the extraction electrode 5 extracting the electrons e to be set independently from a voltage applied to a counter electrode (not shown) to cause a fluorescent body (not shown) to emit light. Accordingly, the extraction electrode 5 can be provided in the vicinity of the electron emitting region 4, and as a result, the electrons e can be extracted at a lower voltage.

A specific exemplary structure and a method for producing the same in the fourth example according to the present invention will be described below.

First, as shown in FIG. 22(a), the conductive layer 1 having the surface roughened is formed on an Si substrate 11.

An exemplary technique for roughening the surface of the conductive layer 1 is forming the conductive layer 1 by thermal spraying. The size of the convex and concave portions (surface roughness) obtained in this manner is controllable by adjusting the thermal spraying conditions. A surface roughness of about 16 μm can be obtained at the maximum. Since thermal spraying is not a vacuum process and has a feature of forming a film at atmospheric pressure, the cost for forming the conductive layer 1 can be reduced.

Alternatively, it is possible to form the conductive layer 1 to have a flat surface and then roughen the surface by sand blasting. The sand blasting can form sharp projections at the surface of the conductive layer 1.

It is also possible to form the conductive layer 1 to have a flat surface and then roughen the surface by chemical etching. When, for example, wet etching is used, convex and concave portions having a surface roughness of about 2 μm can be formed by spraying the surface of the conductive layer 1 with a prescribed etchant.

Still alternatively, the convex and concave portions can be formed at the surface of the conductive layer 1 by first roughening the surface of the substrate 11 and then forming the conductive layer 1 on the roughened surface. The surface of the substrate 1 can be roughened by the above-mentioned sand blasting or etching.

Then, as shown in FIG. 22(b), an $SiO_2$ layer 2 having a thickness of 500 Å is formed on the resultant convex and concave portions of the conductive layer 1. Then, as shown in FIG. 22(c), diamond particles 3 having an average particle diameter of 10 μm are caused to adhere to the $SiO_2$ layer 2, thereby forming the electron emitting region 4.

The diamond particles 3 are caused to adhere by, for example, mixing the diamond particles 3 in a vehicle and performing spin-coating; immersing the substrate 11 in FIG. 22(b) in a solution containing the particles 3 dispersed therein and applying ultrasonic vibration to the solution so that the particles 3 in the solution are caused to adhere to the substrate 11; or performing electrophoresis. By any of the techniques, the particles 3 can be caused to adhere to the substrate 11 while being out of contact with one another by appropriately setting the adhering conditions.

By any of the above-mentioned processes (and structures obtained by the processes), the plurality of particles 3 are caused to adhere to the conductive layer 1 while being out of contact with one another. As a result, each of the particles 3 acts as an electron emitting source (emitter). Therefore, the amount of current (electrons) emitted from the electron emitting region 4 is the total amount of electrons emitted from all of the particles 3. The resultant electron emitting element can provide a large amount of current.

The extraction electrode 5 having the opening 5a is formed of a thin plate of an appropriate metal material in this state. Then, as shown in FIG. 22(d), the extraction electrode 5 is located with a distance of 1 mm from the electron emitting region 4 so that the opening 5a is located at a position corresponding to the electron emitting region 4. When a voltage was applied to the extraction electrode 5, an emission current of 1 $\mu A/cm^2$ or more was obtained at a voltage of about 2 kV.

The particles 3 forming the electron emitting region 4 can be caused to adhere after the extraction electrode 5 having the opening 5a is located at a prescribed position. It is necessary, in that case, to prevent the adherence of the particles 3 to the extraction electrode 5.

In the structure of this example, a voltage can be applied to an anode electrode (not shown) independently from the voltage applied for extracting the electrons e. For example, an image display having an improved luminance was obtained by applying a voltage of 10 kV to the anode electrode.

The structure of this example provides an effect similar to that of the third example by the adherence of the particles (electron emitting members) 3 forming the electron emitting region 4 to the conductive layer (electron transporting member) 1 having the roughened surface, with the insulating layer (electric field concentration region) 2 interposed therebetween. The practical materials and modifications of the insulating layer 2, the particles 3 and the other components, the resultant effects, the electron emitting mechanism and the like of the structure of this example are similar to those in the first example.

The structure of this example is not limited to the structure shown in FIG. 6A in which the particles 3 as the electron emitting members 3 are provided on the insulating layer 2 which is formed on the conductive layer 1 having a surface having convex and concave portions. For example, the particles 3 having the insulating layer 2 formed on a surface thereof can be provided on the conductive layer 1 having a surface having convex and concave portions, or the particles 3 can be partially buried in the insulating layer 2 formed on the conductive layer 1 having a surface having convex and concave portions, as in the previous examples.

In order to obtain the effect of further concentrating the electric field between the conductive layer 1 and the particles 3 with certainty, the surface roughness of the roughened surface of the conductive layer 1 is preferably sufficiently smaller than the diameter of the particles 3.

Instead of the particle type electron emitting members 3, a layer type (i.e., having a layer structure) electron emitting member 3 can be provided on the conductive layer 1 having a surface having convex and concave portions, with the insulating layer 2 interposed therebetween. A similar effect can be provided.

Figure 6B:
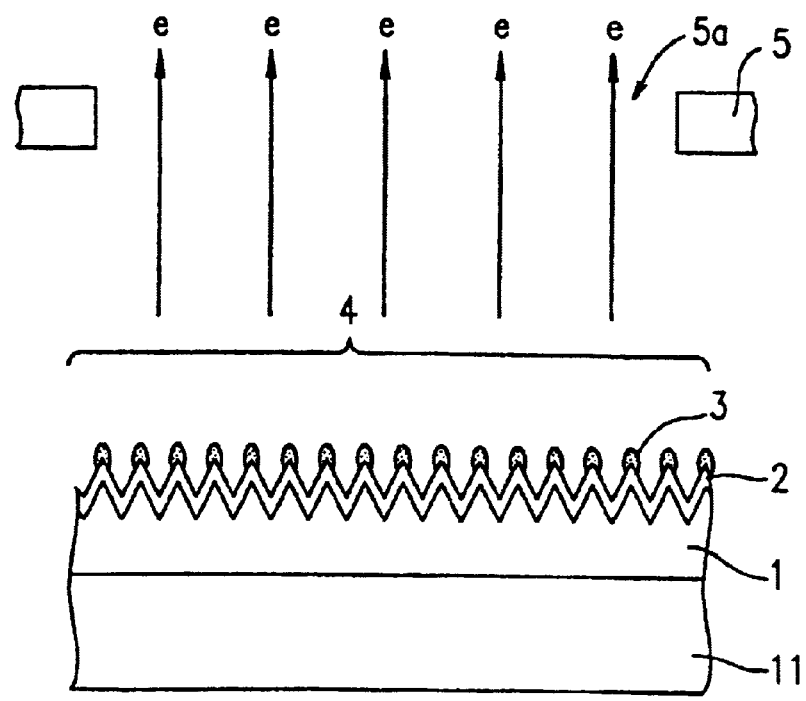
FIG. 6B is a schematic cross-sectional view of a modified structure of an electron emitting device in the fourth example according to the present invention.

As shown in FIG. 6B, the electron emitting layer 3 can be provided only on tops of the convex portions of the conductive layer 1 having a surface having convex and concave portions with the insulating layer 2 interposed therebetween. This structure can provide an effect similar to that of the structure shown in FIG. 6A.

EXAMPLE 5

Figure 7:
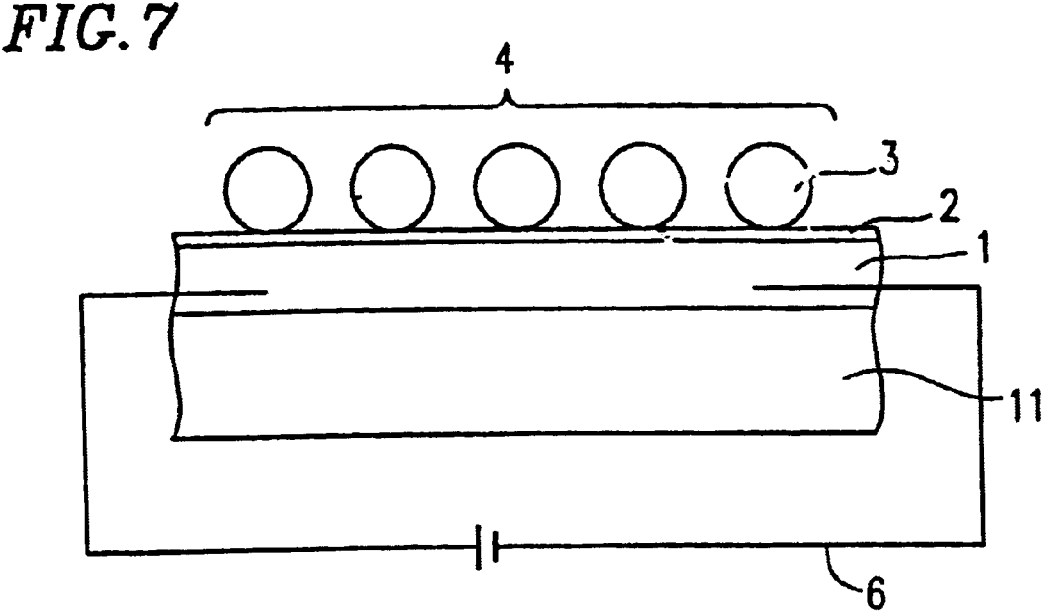
FIG. 7 is a schematic cross-sectional view of an electron emitting device in a fifth example according to the present invention.

FIG. 7 shows a cross-sectional view of an electron emitting device in a fifth example according to the present invention.

The structure shown in FIG. 7 includes a circuit 6 for causing a prescribed amount of current to flow in the conductive layer 1 in addition to the structure shown in FIG. 1A. By causing a part of the current (electrons) flowing in the conductive layer 1 to be emitted from the electron emitting region 4 by the circuit 6, a larger amount of current can be emitted than the amount emitted by the structure shown in FIG. 1A. The structure shown in FIG. 7 is identical with that shown in FIG. 1A in the rest of the structure. Elements corresponding to those in the structure shown in FIG. 1A bear identical reference numerals and the descriptions thereof will be omitted.

A specific exemplary structure and a method for producing the same in the fifth example according to the present invention will be described below.

First, as shown in FIG. 23(a), a conductive layer 1 is formed on a surface of an Si substrate 11. Next, as shown in FIG. 23(b), an $SiO_2$ layer 2 having a thickness of 500 Å is formed on the conductive layer 1, sand the circuit 6 for causing a prescribed amount of current to flow in the conductive layer 1 is formed. Specifically, a circuit element having an appropriate value of resistance (not shown) or the like is used to connect the circuit 6 for causing a current of about 1 mA to flow in the conductive layer 1 at a voltage of 1.5 V. Then, as shown in FIG. 23(c), diamond particles 3 having an average particle diameter of 10 $\mu m$ are caused to adhere to the $SiO_2$ layer 2, thereby forming the electron emitting region 4. The diamond particles 3 are caused to adhere by any of the techniques described in relationship with the first example, for example, by mixing the diamond particles 3 in a vehicle and performing spin-coating. The particles 3 can be caused to adhere to the substrate 11 while being out of contact with one another by appropriately setting the adhering conditions.

In this state, a counter electrode (not shown) was provided 1 mm away from the Si substrate 11 and a voltage was applied to the counter electrode. An emission current of 2 $\mu A/cm^2$ or more was obtained by a voltage of about 3 kV.

The structure of this example provides an effect similar to that of the first example by the adherence of the particles (electron emitting members) 3 forming the electron emitting region 4 to the conductive layer (electron transporting member) 1 with the insulating layer (electric field concentration region) 2 interposed therebetween. The practical materials and modifications of the insulating layer 2, the particles 3 and the other components, the resultant effects, the electron emitting mechanism and the like of the structure of this example are similar to those in the previous examples.

The structure of this example is not limited to the structure shown in FIG. 7 in which the particles 3 as the electron emitting members 3 are provided on the insulating layer 2 which is formed on the conductive layer 1. For example, the particles 3 having the insulating layer 2 formed on a surface thereof can be provided on the conductive layer 1, or the particles 3 can be partially buried in the insulating layer 2 formed on the conductive layer 1, as in the previous examples.

EXAMPLE 6

Figure 8:
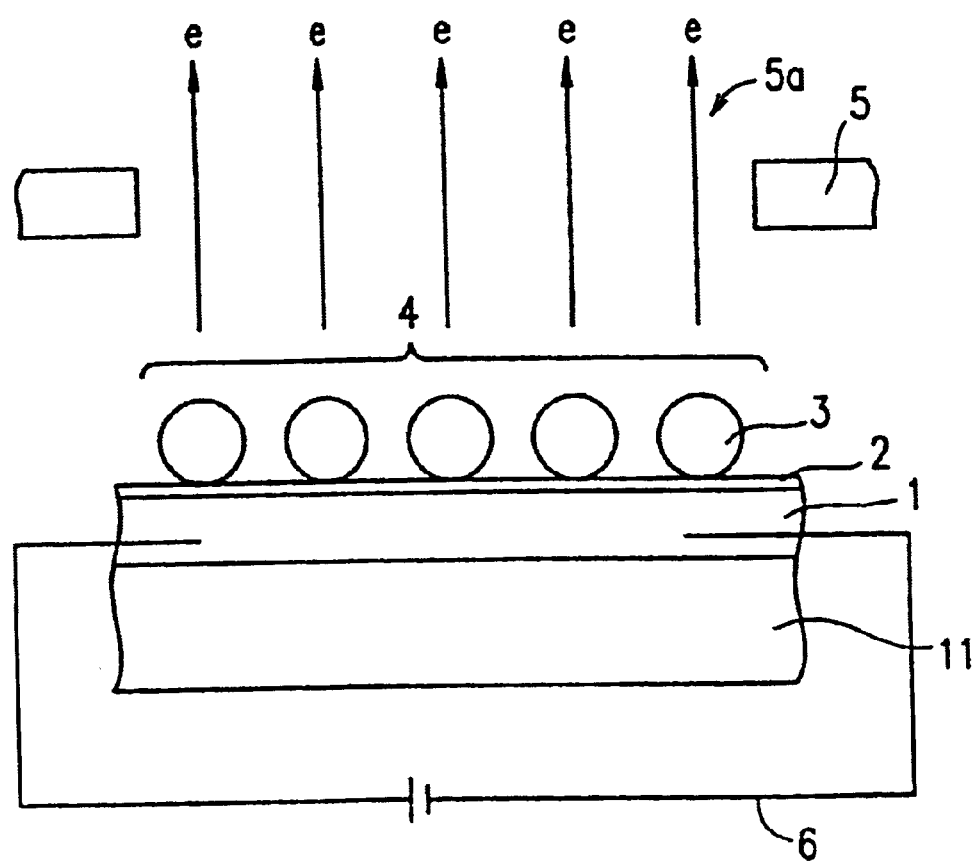
FIG. 8 is a schematic cross-sectional view of an electron emitting device in a sixth example according to the present invention.

FIG. 8 shows a cross-sectional view of an electron emitting device in a sixth example according to the present invention.

The structure shown in FIG. 8 includes a circuit 6 for causing a prescribed amount of current to flow in the conductive layer 1 in addition to the structure shown in FIG. 4. By causing a part of the current (electrons) flowing in the conductive layer 1 to be emitted from the electron emitting region 4 by the circuit 6, a larger amount of current can be emitted than the amount emitted by the structure shown in FIG. 4. The structure shown in FIG. 8 is identical with that shown in FIG. 4 in the rest of the structure. Elements corresponding to those in the structure shown in FIG. 4 bear identical reference numerals and the descriptions thereof will be omitted.

A specific exemplary structure and a method for producing the same in the sixth example according to the present invention will be described below.

First, as shown in FIG. 24(*a*), a conductive layer 1 is formed on a surface of an Si substrate 11. Next, as shown in FIG. 24(*b*), an $SiO_2$ layer 2 having a thickness of 500 Å is formed on the conductive layer 1, and the circuit 6 for causing a prescribed amount of current to flow in the conductive layer 1 is formed. Specifically, a circuit element having an appropriate value of resistance (not shown) or the like is used to connect the circuit 6 for causing a current of about 1 mA to flow in the conductive layer 1 at a voltage of 1.5 V. Then, as shown in FIG. 24(*c*), diamond particles 3 having an average particle diameter of 10 μm are caused to adhere to the $SiO_2$ layer 2, thereby forming the electron emitting region 4. The diamond particles 3 are caused to adhere by any of the techniques described in relationship with the previous examples, for example, by mixing the diamond particles 3 in a vehicle and performing spin-coating. The particles 3 can be caused to adhere to the substrate 11 while being out of contact with one another by appropriately setting the adhering conditions.

The extraction electrode 5 having the opening 5*a* is formed of a thin plate of an appropriate metal material in this state. Then, as shown in FIG. 24(*d*), the extraction electrode 5 is located with a distance of 1 mm from the electron emitting region 4 so that the opening 5*a* is located at a position corresponding to the electron emitting region 4. When a voltage was applied to the extraction electrode 5, an emission current of 1 $\mu A/cm^2$ or more was obtained at a voltage of about 2 kV.

The particles 3 forming the electron emitting region 4 can be caused to adhere after the extraction electrode 5 having the opening 5*a* is located at a prescribed position. It is necessary, in that case, to prevent the adherence of the particles 3 to the extraction electrode 5.

In the structure of this example, a voltage can be applied to an anode electrode (not shown) independently from the voltage applied for extracting the electrons e. For example, an image display having an improved luminance was obtained by applying a voltage of 10 kV to the anode electrode.

The structure of this example provides an effect similar to that of the second example by the adherence of the particles (electron emitting members) 3 forming the electron emitting region 4 to the conductive layer (electron transporting member) 1 with the insulating layer (electric field concentration region) 2 interposed therebetween. The practical materials and modifications of the insulating layer 2, the particles 3 and the other components, the resultant effects, the electron emitting mechanism and the like of the structure of this example are similar to those in the previous examples.

The structure of this example is not limited to the structure shown in FIG. 8 in which the particles 3 as the electron emitting members 3 are provided on the insulating layer 2 which is formed on the conductive layer 1. For example, the particles 3 having the insulating layer 2 formed on a surface thereof can be provided on the conductive layer 1, or the particles 3 can be partially buried in the insulating layer 2 formed on the conductive layer 1, as in the previous examples.

EXAMPLE 7

FIG. 9 shows a cross-sectional view of an electron emitting device in a seventh example according to the present invention.

The structure shown in FIG. 9 includes a circuit 6 for causing a prescribed amount of current to flow in the conductive layer 1 in addition to the structure shown in FIG. 5A. By causing a part of the current (electrons) flowing in the conductive layer 1 to be emitted from the electron emitting region 4 by the circuit 6, a larger amount of current can be emitted than the amount emitted by the structure shown in FIG. 5A. The structure shown in FIG. 9 is identical with that shown in FIG. 5A in the rest of the structure. Elements corresponding to those in the structure shown in FIG. 5A bear identical reference numerals and the descriptions thereof will be omitted.

A specific exemplary structure and a method for producing the same in the seventh example according to the present invention will be described below.

First, as shown in FIG. 25(*a*), a conductive layer 1 having a surface roughened is formed on a surface of an Si substrate 11 using any of the techniques described in relationship with the previous examples. Next, as shown in FIG. 25(*b*), an $SiO_2$ layer 2 having a thickness of 500 Å is formed on the conductive layer 1 having a roughened surface, and the circuit 6 for causing a prescribed amount of current to flow in the conductive layer 1 is formed. Specifically, a circuit element having an appropriate value of resistance (not shown) or the like is used to connect the circuit 6 for causing a current of about 1 mA to flow in the conductive layer 1 at a voltage of 1.5 V. Then, as shown in FIG. 25(*c*), diamond particles 3 having an average particle diameter of 10 μm are caused to adhere to the $SiO_2$ layer 2, thereby forming the electron emitting region 4. The diamond particles 3 are caused to adhere by any of the techniques described in relationship with the previous examples, for example, by mixing the diamond particles 3 in a vehicle and performing spin-coating. The particles 3 can be caused to the substrate 11 while being out of contact with one another by appropriately setting the adhering conditions.

In this state, a counter electrode (not shown) was provided 1 mm away from the Si substrate 11 and a voltage was applied to the counter electrode. An emission current of 2 $\mu A/cm^2$ or more was obtained at a voltage of about 2 kV.

The structure of this example provides an effect similar to that of the third example by the adherence of the particles (electron emitting members) 3 forming the electron emitting region 4 to the conductive layer (electron transporting member) 1 having a surface having convex and concave portions, with the insulating layer (electric field concentration region) 2 interposed therebetween. The practical materials and modifications of the insulating layer 2, the particles 3 and the other components, the resultant effects, the electron emitting mechanism and the like of the structure of this example are similar to those in the previous examples.

The structure of this example is not limited to the structure shown in FIG. 9 in which the particles 3 as the electron emitting members 3 are provided on the insulating layer 2 which is formed on the conductive layer 1 having a surface having convex and concave portions. For example, the particles 3 having the insulting layer 2 formed on a surface thereof can be provided on the conductive layer 1 having a surface having convex and concave portions, or the particles 3 can be partially buried in the insulating layer 2 formed on the conductive layer 1 having a surface having convex and concave portions, as in the third example.

The structure shown in FIG. 8 can be modified in a manner similar to that described in relationship with the third example, needless to say. For example, the circuit 6 described above can be connected to the structure described with reference to FIG. 5B.

EXAMPLE 8

FIG. 10 shows a cross-sectional view of an electron emitting device in an eighth example according to the present invention.

The structure shown in FIG. 10 includes a circuit 6 for causing a prescribed amount of current to flow in the conductive layer 1 in addition to the structure shown in FIG. 6A. By causing a part of the current (electrons) flowing in the conductive layer 1 to be emitted from the electron emitting region 4 by the circuit 6, a larger amount of current can be emitted than the amount emitted by the structure shown in FIG. 6A. The structure shown in FIG. 10 is identical with that shown in FIG. 6A in the rest of the structure. Elements corresponding to those in the structure shown in FIG. 6A bear identical reference numerals and the descriptions thereof will be omitted.

A specific exemplary structure and a method for producing the same in the eighth example according to the present invention will be described below.

Figure 26:
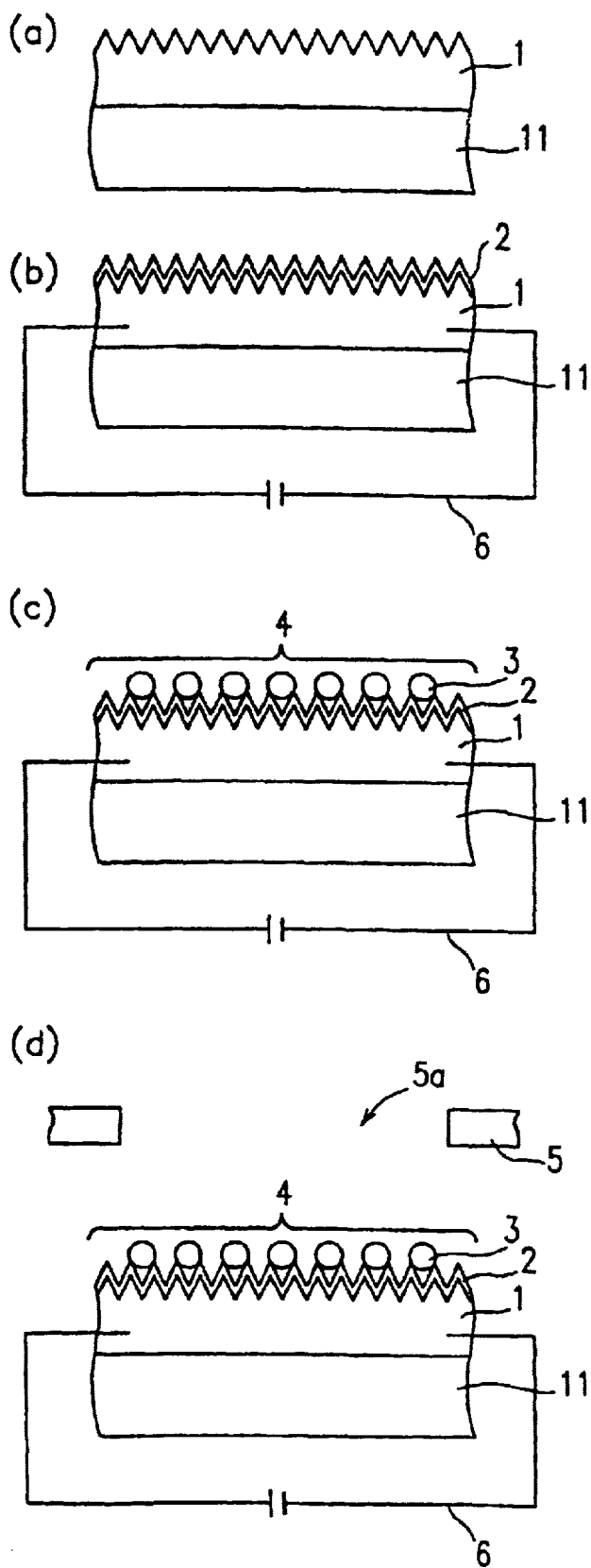
FIGS. 26(a) through (d) are cross-sectional views schematically illustrating steps for producing the electron emitting device shown in FIG. 10.

First, as shown in FIG. 26(*a*), a conductive layer 1 having a surface roughened is formed on a surface of an Si substrate 11 using any of the techniques described in relationship with the previous examples. Next, as shown in FIG. 26(*b*), an SiO$_2$ layer 2 having a thickness of 500 Å is formed on the conductive layer 1, and the circuit 6 for causing a prescribed amount of current to flow in the conductive layer 1 is formed. Specifically, a circuit element having an appropriate value or resistance (not shown) or the like is used to connect the circuit 6 for causing a current of about 1 mA to flow in the conductive layer 1 at a voltage of 1.5 V. Then, as shown in FIG. 26(*c*), diamond particles 3 having an average particle diameter of 10 μm are caused to adhere to the SiO$_2$ layer 2, thereby forming the electron emitting region 4. The diamond particles 3 are caused to adhere by any of the techniques described in relationship with the previous examples, for example, by mixing the diamond particles 3 in a vehicle and performing spin-coating. The particles 3 can be caused to adhere to the substrate 11 while being out of contact with one another by appropriately setting the adhering conditions.

The extraction electrode 5 having the opening 5*a* is formed of a thin plate of an appropriate metal material in this state. Then, as shown in FIG. 26(*d*), the extraction electrode 5 is located with a distance of 1 mm from the electron emitting region 4 so that the opening 5*a* is located at a position corresponding to the electron emitting region 4. When a voltage was applied to the extraction electrode 5, an emission current of 1 μA/cm$^2$ or more was obtained at a voltage of about 2 kV.

In the structure of this example, a voltage can be applied to an anode electrode (not shown) independently from the voltage applied for extracting the electrons e. For example, an image display having an improved luminance was obtained by applying a voltage of 10 kV to the anode electrode.

The structure of this example provides an effect similar to that of the fourth example by the adherence of the particles (electron emitting members) 3 forming the electron emitting region 4 to the conductive layer (electron transporting member) 1 having a surface roughened to have convex and concave portions, with the insulating layer (electric field concentration region) 2 interposed therebetween. The practical materials and modifications of the insulating layer 2, the particles 3 and the other components, the resultant effects, the electron emitting mechanism and the like of the structure of this example are similar to those in the previous examples.

The structure of this example is not limited to the structure shown in FIG. 10 in which the particles 3 as the electron emitting members 3 are provided on the insulating layer 2 which is formed on the conductive layer 1 having a surface having convex and concave portions. For example, the particles 3 having the insulating layer 2 formed on a surface thereof can be provided on the conductive layer 1 having a surface having convex and concave portions, or the particles 3 can be partially buried in the insulating layer 2 formed on the conductive layer 1 having a surface having convex and concave portions, as in the fourth example.

The structure shown in FIG. 10 can be modified in a manner similar to that described in relationship with the fourth example, needless to say. For example, the circuit 6 described above can be connected to the structure described with reference to FIG. 6B.

EXAMPLE 9

An electron emitting device in a ninth example according to the present invention will be described.

Figure 11:
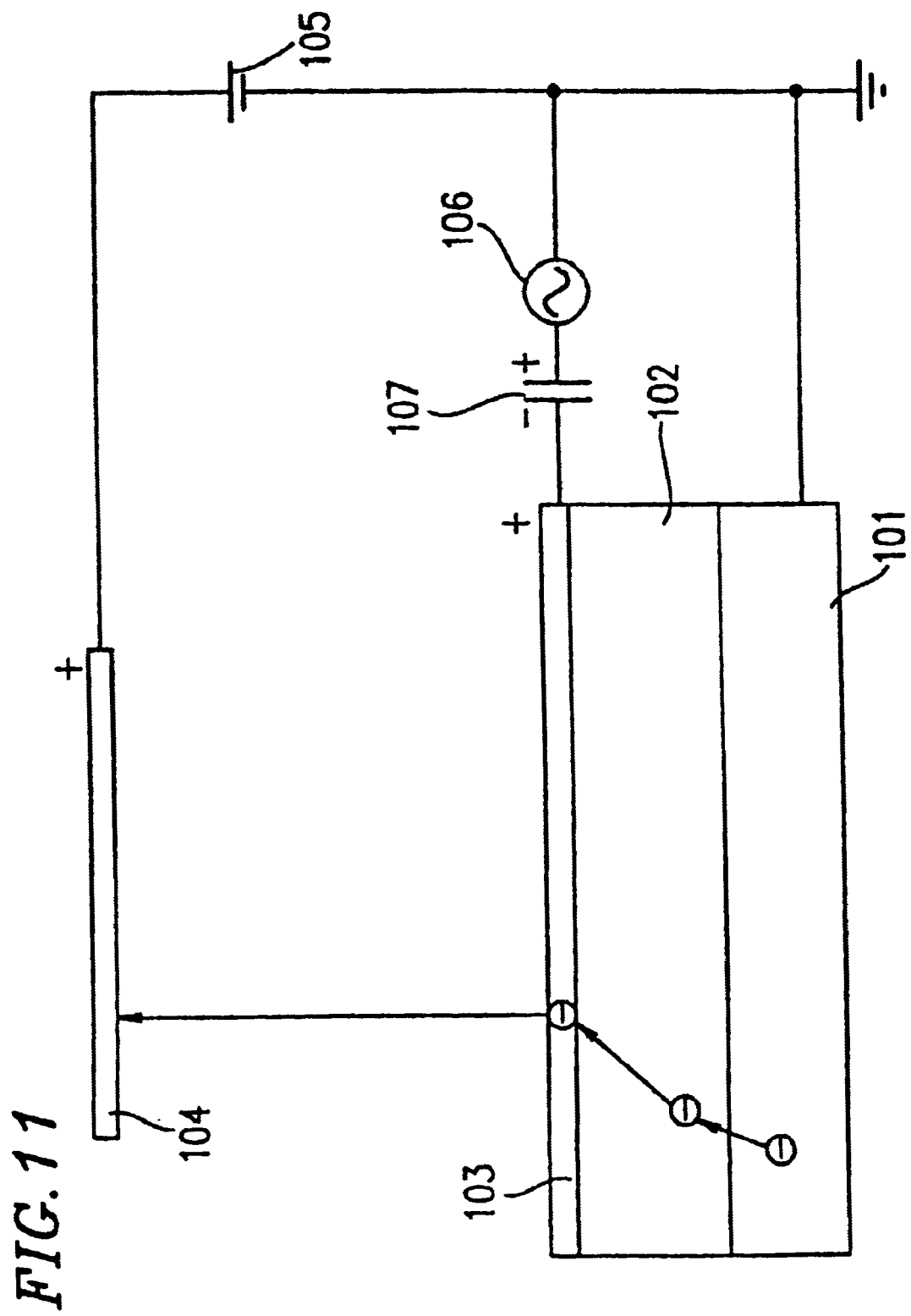
FIG. 11 is a schematic cross-sectional view of an electron emitting device in a ninth example according to the present invention.

In the structure shown in FIG. 11, an electron transporting member 102 and an electron emitting member 103 having a conductivity are formed on an electron injection electrode 101. A counter electrode 104 is provided, to which a voltage for forming an electric field for causing electron emission from the electron emitting member 103 through, for example, a vacuum gap is, to be applied. In order to form an electric field for extracting electrons from a surface of the electron emitting member 103, for example, the electron injection electrode 101 is grounded and a positive voltage is applied to the counter electrode 104 using a power supply 105. Then, an AC power supply having one end thereof, grounded (power supply having a voltage changing timewise) 106 is connected to the electron emitting member 103 through a capacitor 107. Thus, an AC voltage is applied to the electron emitting member 103 using the capacitor 107 and another capacitor as loads. The another capacitor includes the electron injection electrode 101, the conductive electron emitting member 103, and the insulating electron transporting member 102 interposed therebetween. By the voltage application, charges are accumulated or reduced in each of the capacitors in correspondence with a voltage which changes sufficiently slowly.

At the moment when a voltage having a polarity which causes positive charges to be accumulated in an electrode of the capacitor 107 which is closer to the AC power supply 106 is applied, negative charges are accumulated in the other electrode of the capacitor 107, positive charges are accumulated in the electron emitting member 103, and negative charges are accumulated at an interface between the electron injection electrode 101 and the electron transporting member 102. When an electric field applied to the electron transporting member 102 becomes sufficiently strong, the electrons accumulated at the interface between the electron injection electrode 101 and the electron transporting member 102 are tunnel-injected to the electron transporting member 102 and then transported by the electric field, thus reaching the conductive electron emitting member 103. The electron emitting member 103, which is insulated by the capacitor 107 in a DC manner and by the insulating electron transporting member 102, is charged negative. A voltage applied by this charging is superimposed on the voltage applied by the counter electrode 104, and an electric field applied to the electron emitting region 103 by these voltages emits electrons from the electron emitting region 103 to a vacuum area.

Figure 12:
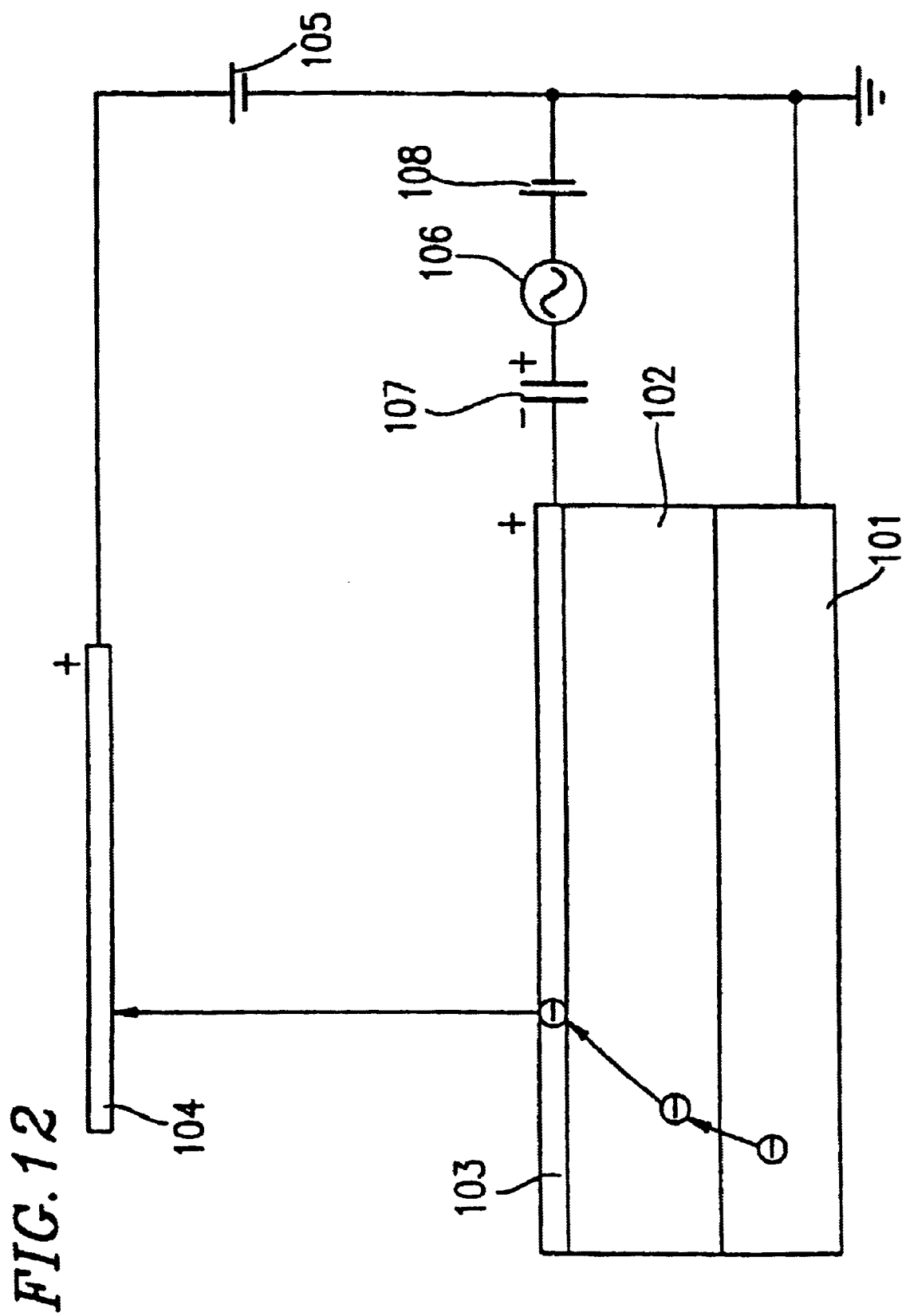
FIG. 12 is a schematic cross-sectional view of a modified structure of an electron emitting device in the ninth example according to the present invention.

FIG. 12 shows an exemplary modification of the structure shown in FIG. 11. Corresponding elements to those in FIG. 11 bear identical reference numerals.

As shown in FIG. 12, the conductive emitting member 103 is insulated from the electron injection electrode 101 in a DC manner by, for example, the capacitor 107. In this state, the AC power supply 106 and a DC power supply 108 which is negative on the side closer to the electron injection electrode 101 and is positive on the side closer to the electron emitting member 103 are connected in series. Voltages of the AC power supply 106 and the DC power supply 108 are applied in the state of being superimposed. This increases the amount of positive charges accumulated in the electron emitting member 103 and also increases the amount of negative charges accumulated in the interface between the electron injection electrode 101 and the electron transporting member 102. In this case, the electrons are injected into the electron emitting member 103 more efficiently by the above-described mechanism, which is preferable.

For the above-described principle of electron emission in this example, it is important that the electron emitting member 103 should be insulated from the electron injection electrode 101 in a DC manner and thus be in an electrically floating state. Such a state of insulation can be achieved by causing the electron transporting member 102 to include an electrically insulated portion or a highly resistive portion when the electron transporting member 102 is supplied with a sufficiently weak DC electric field. Due to the structure having such a state of insulation, efficient electron emission in accordance with the principle of this example occurs.

A preferable state of insulation in the structure shown in FIG. 11 or 12 is as follows: when the electron transporting member 102 between the electron injection electrode 101 and the electron emitting member 103 is supplied with a sufficiently weak electric field so that the electric field strength of a portion of the electron transporting member 102 in which the electric field is most concentrated has a strength of 1 mV/μm or less, the electric resistance of the electron transporting member 102 is 1 kΩcm or more. In such a state, the above-described DC floating state is realized.

In the structures shown in FIGS. 11 and 12, even when the capacitor 107, the AC power supply 106 and the DC power supply 108 are not connected to the electron emitting member 103, electrons are injected from the electron injection electrode 101 as long as the electron emitting member 103 is in an electrically floating state. When the electron emitting member 103 is in an electrically floating state, a voltage is induced, by a DC voltage applied to the counter electrode 104, between the electron emitting member 103 and the electron injection electrode 101, between which interposed the insulating electron transporting member 102, and thus the electrons are injected from the electron injection electrode 101. In this case, it is another important feature that the potential of the electron emitting member 103 changes time-wise.

Specifically, when the positive potential of the electron emitting member 103 becomes high, the electrons are injected from the electron injection electrode 101 to the electron transporting member 102. When the electrons reach the electron emitting member 103, the positive potential of the electron emitting member 103 rapidly changes to a negative potential. Such a change in the potential promotes the electron emission from the electron emitting member 103 to a vacuum area. Thus, in the electron emitting device in this example, the time-wise change in the potential of the electron emitting member 103 is induced, which promotes the electron emission.

Figure 13:
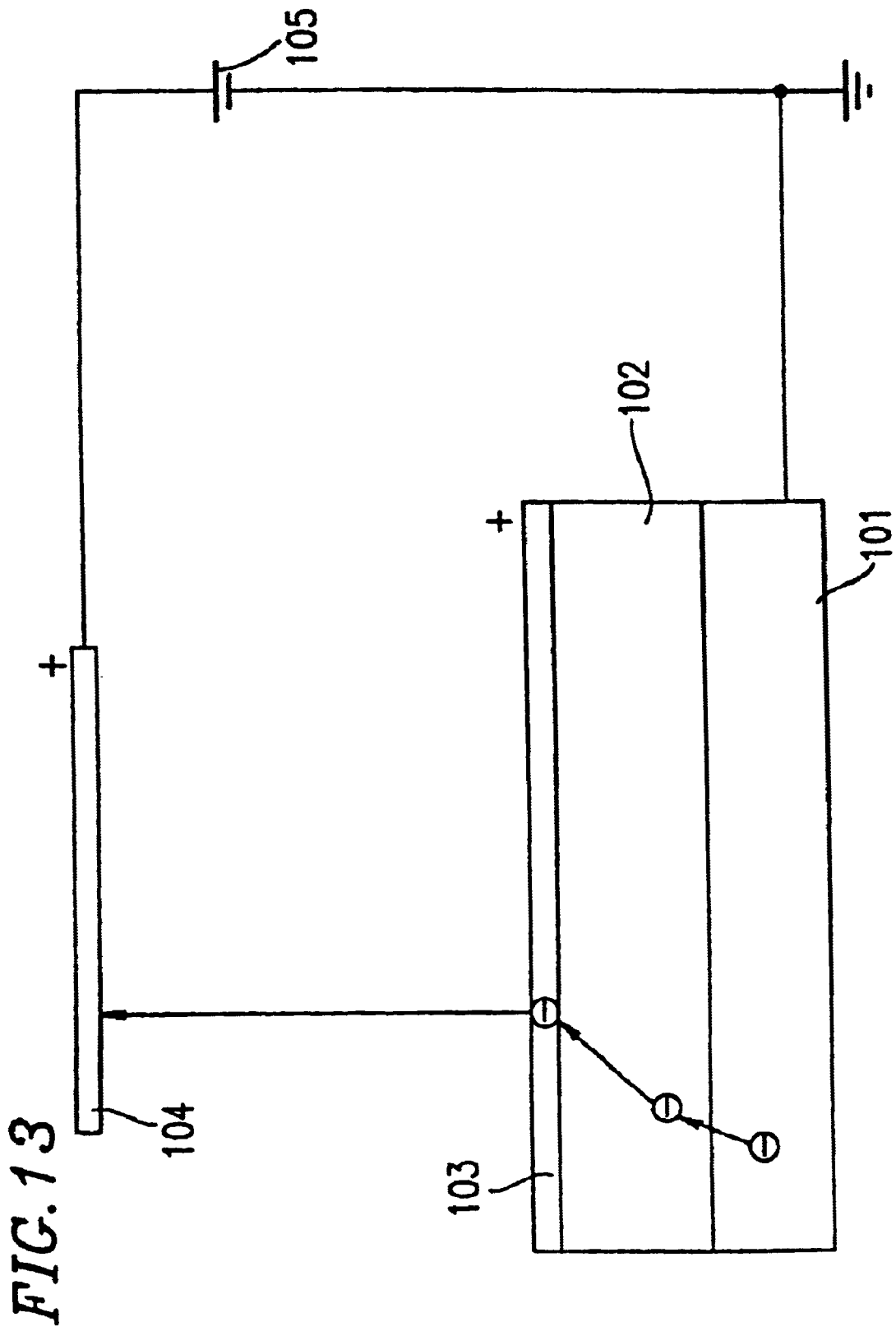
FIG. 13 is a schematic cross-sectional view of another modified structure of an electron emitting device in the ninth example according to the present invention.

The time-wise change in the potential of the electron emitting member 103 can be caused by applying a prescribed voltage or can be automatically induced. For example, as long as a prescribed time-wise change in the potential is caused in the electron emitting member 103, a similar effect can be provided even when the capacitor, the AC power supply and the DC power supply are not connected to the electron emitting member 103 as shown in FIG. 13.

Alternatively, even when the counter electrode 104 is not provided and thus there is no electric field generated by a DC voltage applied to the counter electrode 104, the electrons are injected from the electron injection electrode 101 as long as a voltage is applied between the electron emitting member 103 and the electron injection electrode 101, between which interposed the insulating electron transporting member 102. In this case, when the electron emitting member 103 is formed of a material having a negative electron affinity, the electrons are easily emitted from the electron emitting member 103 to a vacuum area, and thus the electron emitting device performs the prescribed function. As can be appreciated, the counter electrode 104 is not absolutely necessary for electron emission. Even without the counter electrode 104, electron emission to a vacuum area can be caused. The emitted electrons migrate in the vacuum area even at a very weak electric field.

With reference to FIG. 11 again, a specific structure of the electron emitting device in the ninth example according to the present invention will be described.

The structure shown in FIG. 11 is obtained as follows. First, a molybdenum (Mo) substrate having a function of the electron injection electrode 101 is immersed in a solution containing diamond particles dispersed therein, the diamond particles having an average particle diameter of 0.02 μm. In this state, ultrasonic vibration is applied to the solution, thereby forming a high density growth nucleus for diamond growth on a surface of the substrate. The solution containing the diamond particles dispersed therein is a liquid having a pH of about 3 which is obtained by putting 2 g diamond particles into 1 liter of pure water, next adding 2 liters of ethanol thereto, and then adding several drops of hydrofluoric acid thereto. The ultrasonic vibration is applied for 10 minutes. The density of the resultant diamond growth nucleus formed on the surface of the substrate is about $5\times10^{10}/cm^{-2}$.

The substrate having the diamond growth nucleus formed thereon is then put in a microwave CVD apparatus. CO gas diluted with hydrogen (1 to 10%) is supplied to the apparatus, and a diamond thin film is formed at a power of several hundred watts and at a vacuum of 25 to 40 Torr. The substrate temperature is 800 to 900° C. By performing CVD growth for about several minutes, a diamond thin film having a thickness of 0.2 $\mu$m is formed.

When diamond is not doped with anything in the CVD growth process, a diamond thin film which is almost completely insulating is formed. The insulating diamond thin film acts as the electron transporting member 102. As deposited, a surface of the diamond thin film is hydrogenized and has a conductive layer in a surface area thereof. The conductive layer in the surface area of the diamond thin film acts as the conductive electron emitting member 103.

On a part of the conductive layer of the diamond thin film formed in this manner, a Ti electrode is formed by electron beam deposition using a metal mask having a prescribed pattern. On the Ti electrode, Au is deposited. A lead is formed to extend from the Au electrode by Au wire bonding. A lead is also formed to extend from the electron injection electrode 101 as the Mo substrate in a similar manner.

The electron emitting device utilizing the diamond thin film thus formed is put in a vacuum apparatus having a vacuum maintained at $10^{-7}$ Torr or less, and the counter electrode 104 is provided 1 mm away from the electron emitting device.

The lead drawn out from the electron injection electrode 101 as the Mo substrate is grounded, and the lead drawn out from the electron emitting member 103 as the conductive layer in the surface area of the diamond thin film is connected to the capacitor 107. A lead connected to the other electrode of the capacitor 107 is connected to the AC power supply 106, and the other end of the AC power supply 106 is grounded.

With the structure shown in FIG. 11 obtained in this manner, an AC electric field of 10 V/60 Hz was applied to the electron emitting member 103 through the capacitor 107, and a DC voltage of 3 kV was applied between the ground and the counter electrode 104. It was confirmed that electron emission occurs at a current density of 1 $\mu A/cm^2$ or more.

With the structure shown in FIG. 12 including the DC power supply 108, a DC voltage of 2.5 kV was applied between the ground and the counter electrode 104 under conditions similar to those described regarding the structure in FIG. 11, with the DC voltage applied by the DC power supply 108 being 10 V. It was confirmed that electron emission occurs at a current density of 1 $\mu A/cm^2$ or more.

With the structure shown in FIG. 13 excluding the capacitor, the AC power supply and the DC power supply, a DC voltage of 7 kV was applied between the ground and the counter electrode 104. It was confirmed that electron emission occurs at a current density of 1 $\mu A/cm^2$ or more.

EXAMPLE 10

Figure 14:
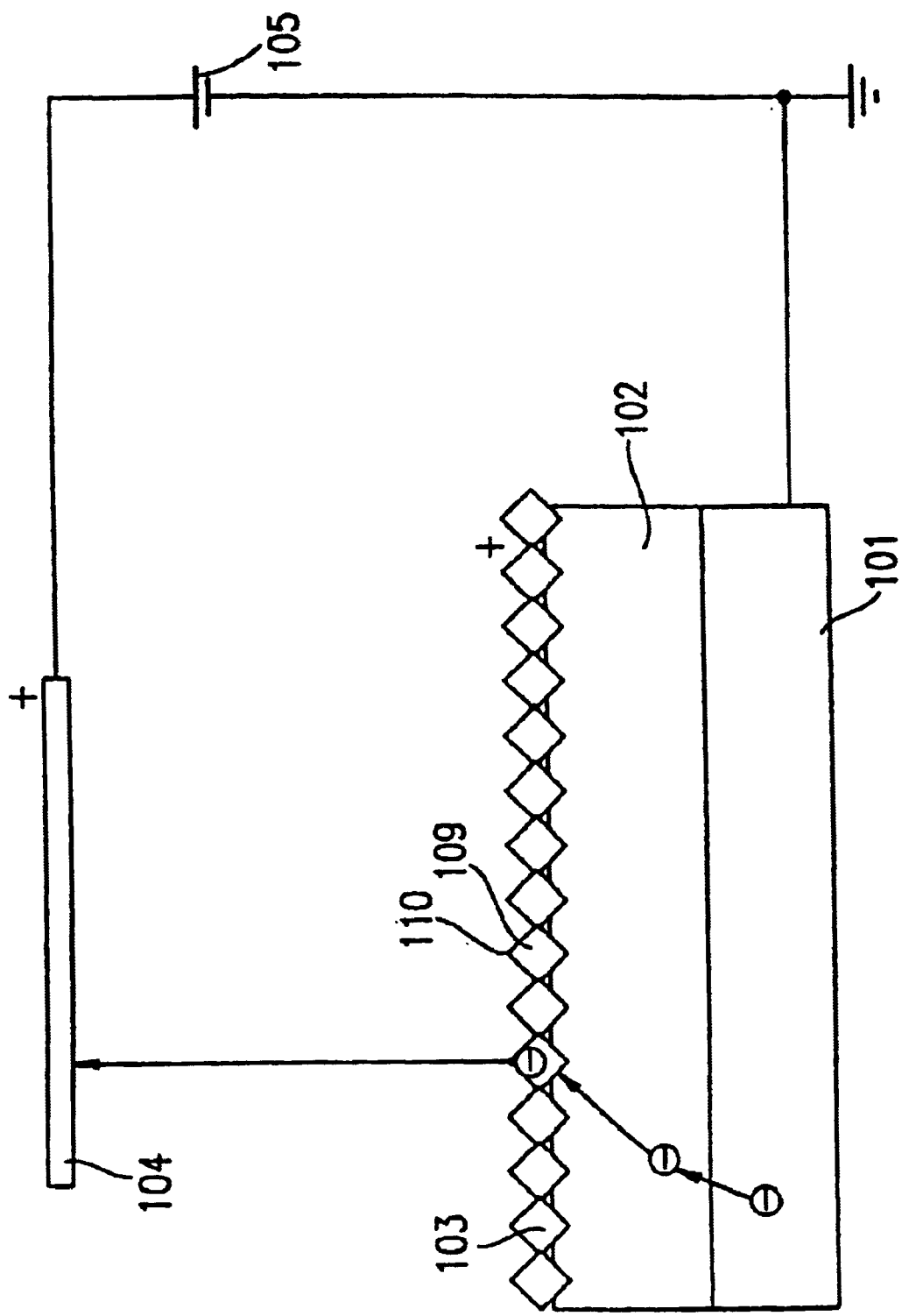
FIG. 14 is a schematic cross-sectional view of an electron emitting device in a tenth example according to the present invention.

FIG. 14 shows a structure of an electron emitting device in a tenth example according to the present invention.

In the case where an electron emitting member 103 having a conductivity is formed of a material 109 containing particles (hereinafter, referred to simply as "particles 109"; for example, carbon particles), an electric field tends to concentrate at tips 110 of the particles 109. Thus, electrons are easily emitted from the tips 110. When the conductive electron emitting member 103 contains graphite particles, the electrons are easily emitted from an edge of the sp2 plane of the c plane of the graphite, which is preferable.

When the particles 109 forming the conductive electron emitting member 103 are wide bandgap semiconductor particles having a bandgap of at least 3.5 eV, the electron affinity, which is usually several eV, has a small positive value or a negative value. By such a value of electron affinity, the electrons injected into the conduction band are emitted to a vacuum area at a small activation energy. It is preferable that the conductive electron emitting member 103 is formed of particles of a material having a negative electron affinity (for example, diamond) since the electrons are easily emitted to a vacuum area. It is also preferable that the conductive electron emitting member 103 contains a compound of nitrogen and at least one element of Ga, Al, In and B since, in this case, the electron emitting member 103 shows a negative or small positive electron affinity and thus electron emission easily occurs.

It is preferable that each of the particles 109 forming the electron emitting member 103 is larger than a cube having a side of 1 nm and can be accommodated in a cube having a side of 1 mm. When the particles 109 are each smaller than a cube having a side of 1 nm, the particles 109 are too small to maintain the crystalline structure and thus the structure becomes unstable. Therefore, it is difficult to maintain stable electron emission. When the particles 109 are each larger than a cube having a side of 1 mm, the areas to which the electrons are emitted are limited, and the density of such areas is lowered. This is not preferable as the electron emitting device.

A specific example of the structure shown in FIG. 14 will be described.

First, diamond particles having a particle diameter of 1 $\mu$m are treated in a hydrogen atmosphere at 600° C. for an hour to form a hydride on a surface thereof, thereby forming a conductive surface layer having a negative electron affinity. The diamond particles are treated in the air at 900° C. for 5 minutes to form an oxide layer on the surface thereof. Then, the resultant diamond particles are pressed onto an Ni electrode and dispersed. The Ni electrode acts as the electron injection electrode 101, and the oxide layer on the surface of the Ni electrode acts as the insulating electron transporting member 102, and the hydrogenized surface of the diamond particles acts as the electron emitting member 103. Thus, the electron emitting device shown in FIG. 14 is obtained.

The electron emitting device utilizing the diamond thin film thus formed is put in a vacuum apparatus having a vacuum maintained at $10^{-7}$ Torr or less, and a counter electrode 104 is provided 1 mm away from the electron emitting device.

A lead was drawn out from the electron injection electrode 101 as the Ni substrate and was grounded, and a DC voltage of 7 kV was applied between the ground and the counter electrode 104. It was confirmed that electron emission occurs at a current density of 1 $\mu A/cm^2$ or more.

Figure 17:
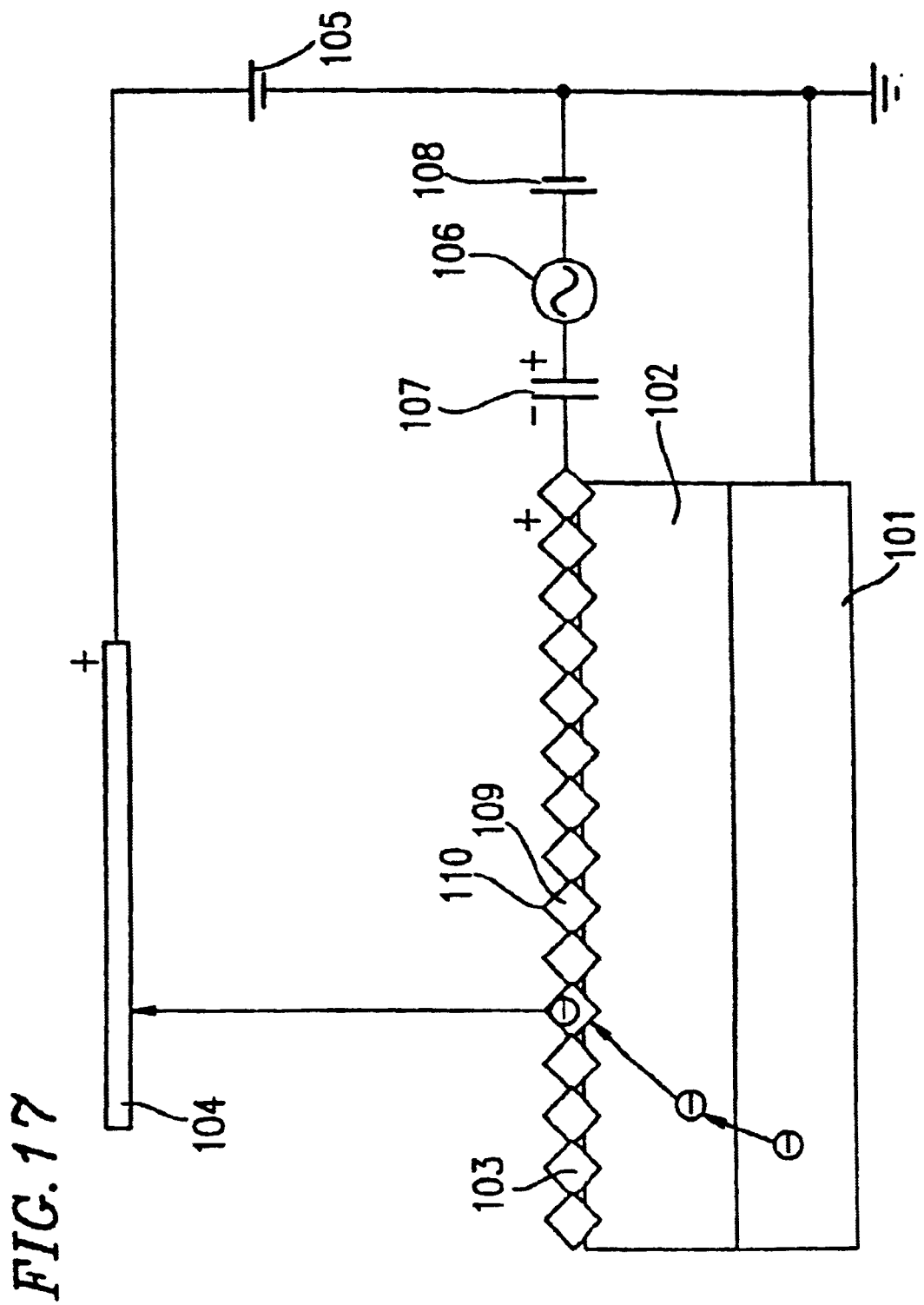
FIG. 17 is a schematic cross-sectional view of a modified structure of an electron emitting device in the tenth example according to the present invention.

When the ratio of the conductive surface area of the diamond particles obtained as a result of hydrogenation with respect to the total surface area of the diamond particles is increased and then the conductive surfaces of the diamond particles are connected to one another, an aggregation of the diamond particles existing in the electron emitting member 103 entirely exhibits a conductivity. When, as shown in FIG. 17, a lead is drawn out from the electron emitting member 103 and the capacitor 107, the AC power supply 106 and the DC power supply 108 are connected to the lead in series, highly efficient electron emission occurs, as described in the ninth example with reference to FIG. 12.

EXAMPLE 11

Figure 15:
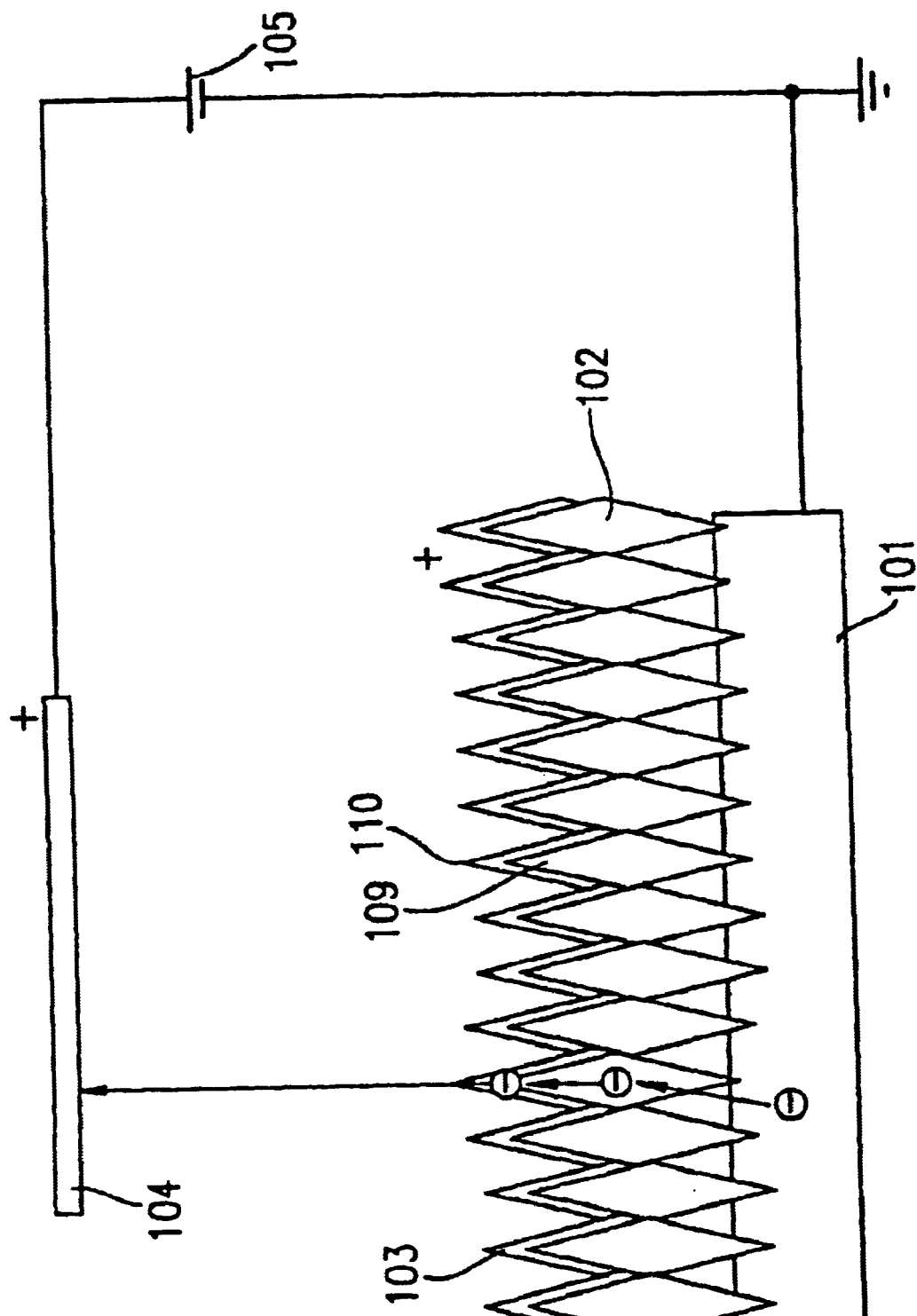
FIG. 15 is a schematic cross-sectional view of an electron emitting device in an eleventh example according to the present invention.

FIG. 15 shows a structure of an electron emitting device in an eleventh example according to the present invention.

As shown in FIG. 15, the electron transporting member 102 is formed of wide bandgap semiconductor particles having a bandgap of 3.5 eV or more, and the conductive electron emitting member 103 is formed on the surface of the particles. In this structure, electrons are efficiently injected to the conduction band of the semiconductor particles of the electron transporting member 102 from the electron injection electrode 101. The electrons injected into the conduction band are transported to the electron emitting member 103 and then easily emitted to a vacuum area from the surface of the wide bandgap semiconductor material forming the electron transporting member 102 having a electron affinity of a small positive value or a negative value. It is preferable that the wide bandgap semiconductor particles having a bandgap of 3.5 eV or more forming the electron transporting member 102 include a compound of nitrogen and at least one element of Ga, Al, In and B, since the electron transporting member 102 shows an electron affinity of a negative value or a small positive value, and thus electron emission easily occurs.

Even when the electron transporting member 102 is formed of a thin film of a wide bandgap semiconductor material having a bandgap of 3.5 eV or more and the conductive electron emitting member 103 is formed on a surface of the thin film, a similar effect is provided. The electron emitting member 103 can also be formed of a wide bandgap semiconductor material as well as the electron transporting member 102.

It is preferable that the electron transporting member 102 (and the electron emitting member 103) is formed of a diamond thin film formed by a vapor phase growth technique, since the negative electron affinity of the diamond can be effectively utilized. The diamond thin film forming the electron transporting member 102 (and the electron emitting member 103) preferably has a thickness of 1 nm or more and 10 μm or less. When the thickness of the diamond thin film is less than 1 nm, it is difficult to maintain the electron transporting member 102 as an insulator. When the thickness of the diamond thin film is more than 10 μm, the electric field induced in the electron transporting member 102 by the voltage applied between the electron injection electrode 101 and the electron emitting member 103 is too weak to easily inject the electrons from the electron injection electrode 101 by tunneling.

It is preferable that a conductive layer in a surface area of hydrogenized diamond particles or a hydrogenized diamond thin film acts as the electron emitting member 103. Since the electron emitting region 103 having a negative electron affinity is automatically formed on a surface of the hydrogenized diamond particles or thin film acting as the electron transporting member 102, the electron emitting device in this example is easily produced.

A specific example of the structure shown in FIG. 15 will be described.

First, diamond particles having a particle diameter of 1 μm are kneaded into a polymeric adhesive, and the resultant substance is applied to a surface of the tungsten (W) electrode substrate. Next, the substrate is put in a microwave CVD apparatus. CO gas diluted with hydrogen (1 to 10%) is supplied to the apparatus, and a diamond thin film is formed at a power of several hundred watts and at a vacuum of 25 to 40 Torr. The substrate temperature is 800 to 900° C. By performing CVD growth for about several minutes, a diamond thin film having a thickness of 0.2 μm is formed. During the formation, the polymeric adhesive is removed from the surface by etching with hydrogen plasma. The diamond particles form a surface made up of the diamond particles which become exposed as the result of the etching. Accordingly, when the adhesive component is entirely etched away, only the tip portions of the diamond particles closer to the vacuum area become conductive as a result of sufficient hydrogenation and sufficient diamond growth. In the interface between the diamond particles and the W electrode and the vicinity thereof, where the hydrogenation and diamond growth is insufficient, is insulating.

The W electrode acts as the electron injection electrode 101. The insulating portions of the diamond particles closer to the W electrode in which hydrogenation and diamond growth are not sufficient act as the electron transporting member 102, and the conductive tip portions of the diamond particles closer to the vacuum area act as the electron emitting member 103. Thus, the electron emitting device in this example is provided.

The electron emitting device utilizing the diamond particles thus formed in put in a vacuum apparatus having a vacuum maintained at $10^{-7}$ Torr or less, and a counter electrode 104 is provided 1 mm away from the electron emitting device.

A lead was drawn out from the electron injection electrode 101 as the W substrate and was grounded, and a DC voltage of 7 kV was applied between the ground and the counter electrode 104. It was confirmed that electron emission occurs at a current density of 1 $\mu$A/cm$^2$ or more.

Figure 18:
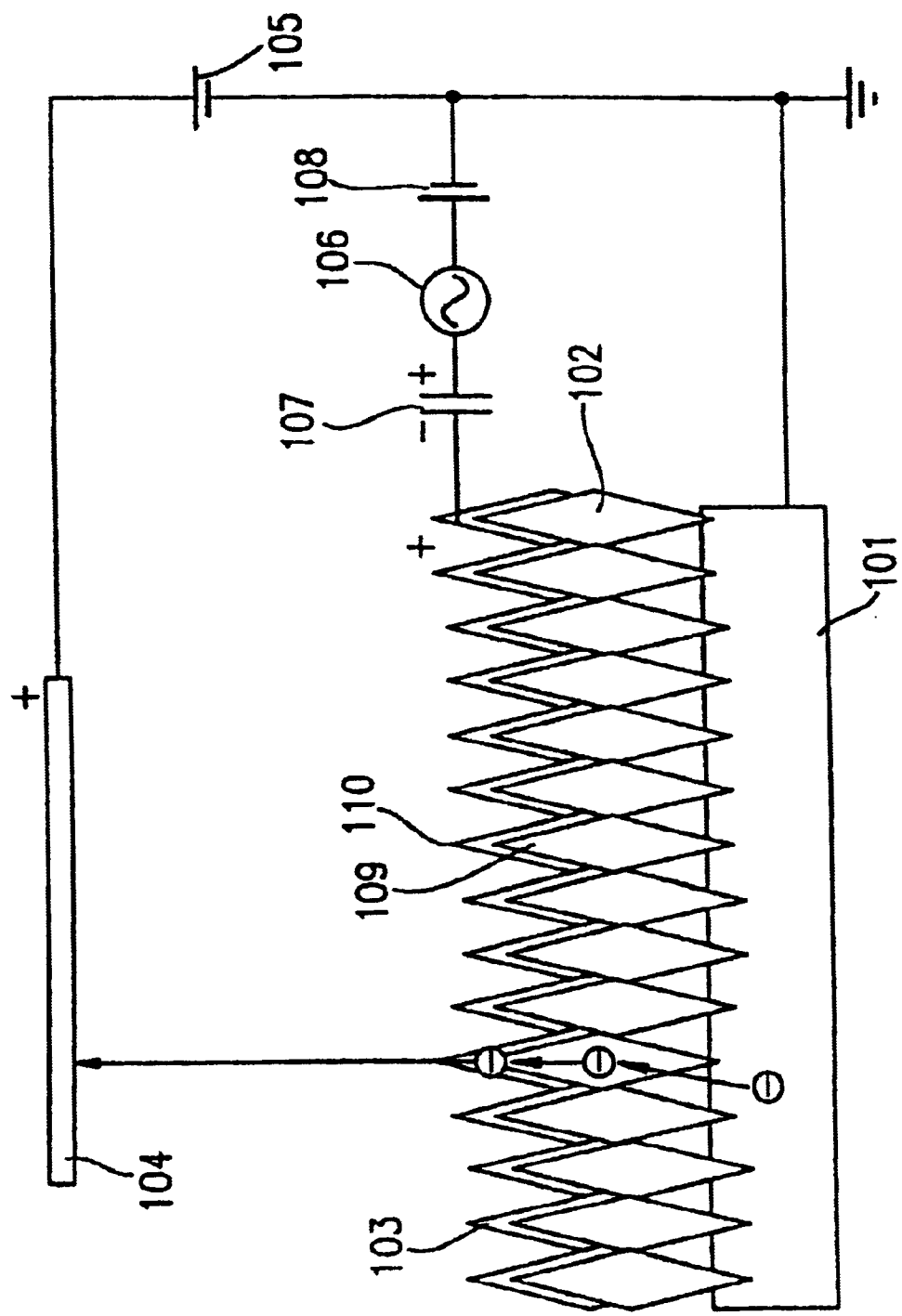
FIG. 18 is a schematic cross-sectional view of a modified structure of an electron emitting device in the eleventh example according to the present invention.

When the density of the diamond particles having a conductive surface as a result of hydrogenation is increased and then the conductive surfaces of the diamond particles are connected to one another, an aggregation of the diamond particles existing in the electron emitting member 103 entirely exhibits a conductivity. When, as shown in FIG. 18, a lead is drawn out from the electron emitting member 103 and the capacitor 107, the AC power supply 106 and the DC power supply 108 are connected to the lead in series, highly efficient electron emission occurs, as described in the ninth example with reference to FIG. 12.

EXAMPLE 12

Figure 16:
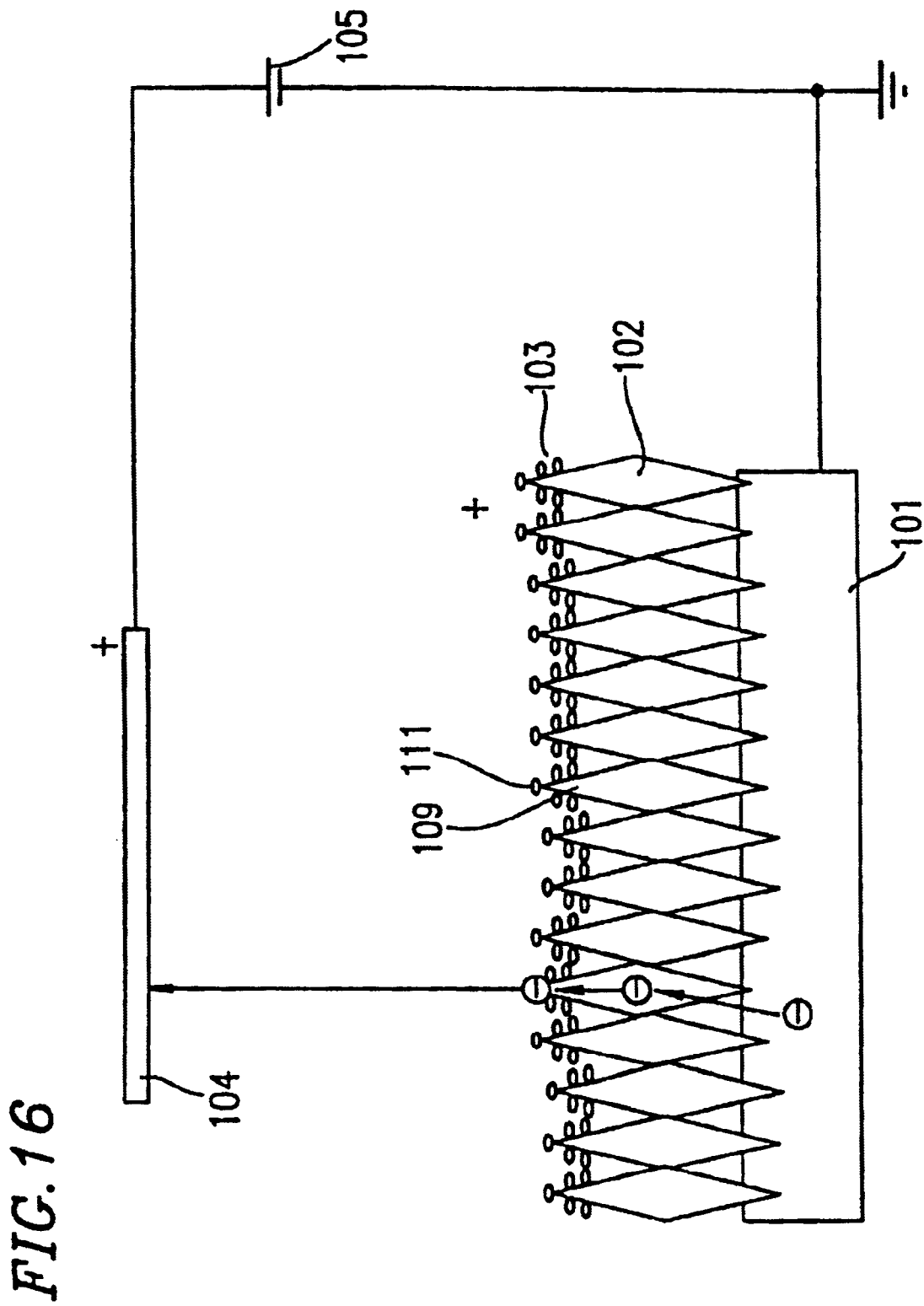
FIG. 16 is a schematic cross-sectional view of an electron emitting device in a twelfth example according to the present invention.

FIG. 16 shows a structure of an electron emitting device in a twelfth example according to the present invention.

The structure of the electron emitting device in this example is a preferable modification of the structures described in the previous examples. Specifically, as shown in FIG. 16, an electron transporting member 102 is formed of diamond particles 109. A conductive electron emitting member 103 is formed of a diamond-containing carbon-based thin film or fine particles 111 formed on at least a part of a surface of the diamond particles 109 forming the electron transporting member 102. In this structure, it is preferable that the diamond particles 109 forming the electron transporting member 102 are sufficiently large with respect to the diamond-containing carbon-based thin film or fine particles 111 forming the electron emitting member 103, since electric field concentration effectively acts on the electron emitting member 103 having a fine surface structure and thus efficient electron emission occurs. Specifically, a preferable effect is provided when the diamond particles 109 forming the electron transporting member 102 each have a diameter of about 0.1 µm to about 1 µm and the thin film or fine particles 111 forming the electron emitting member 103 each have a diameter (thickness) of about 0.01 µm to about 0.1 µm.

The thin film or fine particles 111 forming the electron emitting member 103 can be formed on a part of the surface of the diamond particles 109 forming the electron transporting member 102 and do not need to cover the entire surface.

It is preferable that the electron injection electrode 101 and the electron transporting member 102 are in ohmic contact with each other, since the electrons are efficiently injected from the electron injection electrode 101 in that case. It provides a preferable effect to form a thin insulating layer having a thickness of about 500 nm or less in the electron transporting member 102, since the electric field is applied to the insulating layer in a concentrated manner and the electrons are efficiently injected as described above in the first example and the like.

A specific example of the structure shown in FIG. 16 will be described.

First, diamond particle shaving a particle diameter of 1 µm are kneaded into water, and the resultant substance is applied to a surface of the tungsten (W) electrode substrate. Next, the substrate is put in a microwave CVD apparatus. CO gas diluted with hydrogen (1 to 10%) is supplied to the apparatus, and a diamond thin film is formed at a power of several hundred watts and at a vacuum of 25 to 40 Torr. The substrate temperature is 800 to 900° C. By performing DVD growth for about several minutes, diamond particles 111 having a particle diameter of 0.1 µm is formed on a surface of the diamond particles 109 having a particle diameter of about 1 µm adhering to the substrate.

During the formation, the diamond particles 111 formed by the CVD growth process do not form a continuous film. Especially at the interface between the diamond particles 109 adhering to the W electrode substrate and the W electrode substrate and the vicinity thereof, the growth of the diamond particles 111 is insufficient. As a result, the surface of the diamond particles 109 adhering to the W electrode substrate is insulating due to the insufficient hydrogenation and insufficient diamond growth. Only a surface of the diamond particles 111 formed by CVD growth becomes conductive as a result of sufficient hydrogenation and sufficient diamond growth. In consequence, the CVD-grown diamond particles 111 acting as the electron emitting member 103 is electrically connected to the electron injection electrode 101 through the surface of the diamond particles 109 adhering to the W electrode substrate and having a low level of conductivity.

The W electrode acts as the electron injection electrode 101. In the insulating diamond particles 109 adhering to the W electrode, portions which are close to the W electrode and thus are not treated with sufficient hydrogenation or sufficient diamond growth act as the electron transporting member 102. The CVD-grown diamond particles 111 acts as the conductive electron emitting member 103. Thus, the electron emitting device in this example is provided.

The electron emitting device utilizing the diamond thin film thus formed is put in a vacuum apparatus having a vacuum maintained at $10^{-7}$ Torr or less, and a counter electrode 104 is provided 1 mm away from the electron emitting device.

A lead was drawn out from the electron injection electrode 101 as the W substrate and was grounded, and a DC voltage of 7 kV was applied between the ground and the counter electrode 104. It was confirmed that electron emission occurs at a current density of 1 $\mu A/cm^2$ or more.

In some of the above-described examples, the process for growing a diamond thin film forming the electron transporting member 102 and the electron emitting member 103 by a vapor phase growth technique preferably includes a pre-growth treatment step of distributing diamond growth nuclei having a distribution density of $1 \times 10^{10}/cm^2$ or more. Such a pre-growth treatment step allowed a very thin continuous diamond film to be formed; vapor phase growth of a diamond thin film having a thickness of 500 nm or less as an insulating layer was first realized. When, for example, a diamond thin film is formed by microwave CVD vapor phase growth using hydrogen-diluted methane, the surface of the diamond thin film is hydrogenized to be conductive, and as a result, the conductive electron emitting region is automatically formed.

EXAMPLE 13

Figure 27:
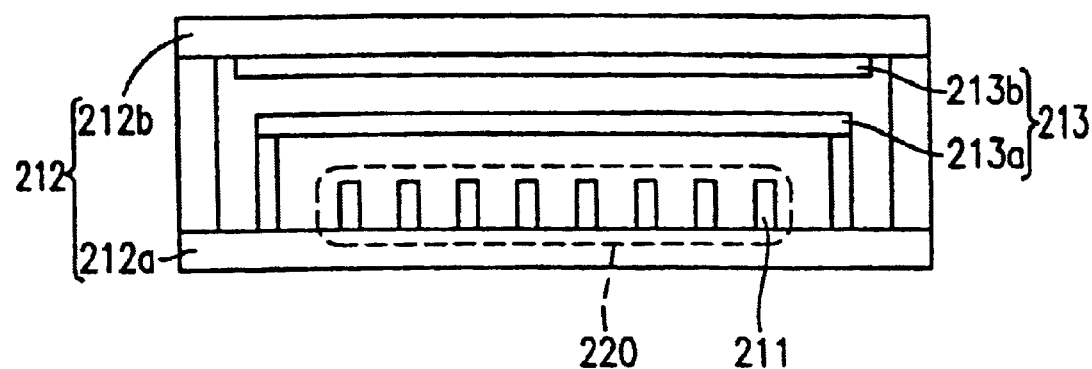
FIG. 27 is a schematic cross-sectional view of a structure of an image display apparatus in a thirteenth example according to the present invention.

FIG. 27 shows a schematic cross-sectional view of an image display apparatus in a thirteenth example according to the present invention. This image display apparatus includes an electron emitting device according to the present invention described above as an electron emitting source.

Specifically, a plurality of electron emitting devices 211 according to the present invention are formed on a substrate 212a acting as a part of an enclosure 212, thus forming an electron emitting source 220. Reference numeral 213 represents an image forming section, which includes an electron driving electrode 213a for performing driving and control such as, for example, acceleration, deflection and modulation of electrons from the electron emitting source 220 (electron emitting devices 211) and a fluorescent body 213b adhering to an inner face of a part 212b of the enclosure 212. The image forming section 213 displays images by causing the fluorescent body 213b to emit light by the driven electrons.

Since the electron emitting source 220 includes the electron emitting devices 211 according to the present invention, a large amount of emission current can be generated at a low voltage. Thus, a planar image display apparatus which can be driven at a low voltage and provide a high luminance is realized.

FIGS. 28(a) through 28(d) schematically show a method for producing the image display apparatus in this example.

First, as shown in FIG. 28(a), a plurality of electron emitting devices 211 are formed on the substrate 212a acting as a part of the enclosure 212 by any method described in the examples of the present invention, thereby forming the electron emitting source 220. The electron driving electrode 213a as a part of the image forming section is provided (FIG. 28(b)). The enclosure part 212b having the fluorescent body 213b adhering to the inner face thereof is provided (FIG. 28(c)). Then, a vacuum is applied to the inside of the enclosure 212 to provide the image display apparatus in this example shown in FIG. 27 (FIG. 28(d)).

INDUSTRIAL APPLICABILITY

As described above, according to the present invention, an electron emitting member in the form of, for example, particles adheres to a conductive layer as an electron transporting member, with an electric field concentration region formed of an insulating layer or the like interposed therebetween. Accordingly, the electric field is efficiently concentrated in the electric field concentration region (insulating layer) between the electron transporting member (conductive layer) and the electron emitting member (particles). As a result, the electron barrier existing at the interface between the electron transporting member (conductive layer) and the electron emitting member (particles) is lowered, and thus the electrons are easily injected into the electron emitting member (particles). The resultant electron emitting device allows electrons to be emitted at a low voltage.

According to the present invention, the electron transporting member is provided between the electron injection electrode and the electron emitting member. The electron transporting member is structured so as to include an electrically insulating or highly resistive portion when a weak DC electric field is applied between the electron injection electrode and the electron emitting member. The resultant electron emitting device has all the following features demanded on the electron emitting device: (1) being capable of emitting electrons at a relatively weak electric field (the electron emitting member having a small electron affinity); (2) having sufficient chemical stability in the surface of the electron emitting member (emitter) to maintain stable electron emission; and (3) being excellent in anti-wear and anti-heat characteristics. Thus, the resultant electron emitting device is comprehensively superior.

What is claimed is:

1. An electron emitting device comprising an electron transporting member; an electron emitting member; an electric field concentration region formed between the electron transporting member and the electron emitting member; and an electrode facing the electron emitting member, wherein the electron emitting member is formed of particles, wherein the electric field concentration region is formed of an insulating layer, wherein an electric field is concentrated in the electric field concentration region as a result of an electric field generated by a differential voltage between the electrode and the electron emitting member, wherein the electric field concentrated in the electric field concentration region is stronger than the electric field between the electron emitting member and the electrode, and wherein electrons are injected from the electron transporting member to the electron emitting member as a result of the electric field concentrated in the electric field concentration region.

2. An electron emitting device according to claim 1, wherein the electron transporting member is a conductive layer.

3. An electron emitting device according to claim 1, wherein a surface of the electron transporting member is roughened so as to have convex and concave portions, and the electron emitting member is provided on the roughened surface of the electron transporting member, with at least the convex portions of the convex and concave portions interposed therebetween.

4. An electron emitting device according to claim 1, further comprising a circuit for causing an electric current to flow in the electron transporting member.

5. An electron emitting device according to claim 1, wherein the electric field concentration region is formed of the insulating layer formed on a surface of the particles forming the electron emitting member, and the particles are provided on the electron transporting member with the insulating layer interposed therebetween.

6. An electron emitting device according to claim 1, wherein the electron transporting member is a conductive layer, and the electric field concentration region is formed of the insulating layer formed on the conductive layer, and the electron emitting member is formed of particles provided so as to be partially buried in the insulating layer.

7. An electron emitting device according to claim 1, wherein the electric field concentration region has a thickness of 1000 Å or less.

8. An electron emitting device according to claim 1, wherein the electron emitting member is formed of a plurality of particles provided independently, out of contact with one another.

9. An electron emitting device according to claim 1, wherein the electron emitting member is formed of particles of a material having a negative electron affinity.

10. An electron emitting device according to claim 9, wherein the particles are diamond particles.

11. An electron emitting device according to claim 10, wherein the diamond particles are artificial diamond particles.

12. An electron emitting device according to claim 10, wherein the diamond particles are diamond particles synthesized by a vapor phase technique.

13. An electron emitting device according to claim 9, wherein the particles are carbon particles partially having a diamond structure.

14. An electron emitting device according to claim 10, wherein an outermost surface layer of the diamond particles has a termination structure bonded with hydrogen.

15. An electron emitting device according to claim 13, wherein an outermost surface layer of the carbon particles has a termination structure bonded with hydrogen.

16. An electron emitting device according to claim 10, wherein the diamond particles are formed by being exposed to a hydrogen atmosphere of 600° C. or higher.

17. An electron emitting device according to claim 13, wherein the carbon particles are formed by being exposed to a hydrogen atmosphere of 600° C. or higher.

18. An electron emitting device according to claim 10, wherein the diamond particles include an impurity.

19. An electron emitting device according to claim 13, wherein the carbon particles include an impurity.

20. An electron emitting device according to claim 18, wherein the impurity is formed by ion implantation.

21. An electron emitting device according to claim 18, wherein the impurity has a density of $1\times10^{13}/cm^3$ or higher.

22. An electron emitting device according to claim 19, wherein the impurity is formed by ion implantation.

23. An electron emitting device according to claim 19, wherein the impurity has a density of $1\times10^{13}/cm^3$ or higher.

24. An electron emitting device according to claim 1, wherein the electron transporting member is a conductive layer formed of a material having a small work function.

25. A method for producing an electron emitting device, comprising the steps of:

forming an electron transporting member on a substrate; and providing an electron emitting member in contact with the electron transporting member with an electric field concentration region interposed therebetween, wherein the step of providing the electron emitting member includes the steps of:

causing a mixture of a liquid curable insulating substance and prescribed particles to adhere to a conductive layer acting as the electron transporting member, curing the liquid curable insulating substance, and
selectively removing only a surface portion of the curing insulating substance to expose a portion of the particles included in the mixture, thereby causing the exposed portion of the particles to act as the electron emitting member.

26. A method for producing an electron emitting device according to claim 25, wherein the selective removing step is performed by chemical etching.

27. A method for producing an electron emitting device according to claim 26, wherein the chemical etching is performed by a hydrogen plasma irradiation process.

28. A method for producing an electron emitting device, comprising the steps of:
   forming an electron transporting member on a substrate; and
   providing an electron emitting member in contact with the electron transporting member with an electric field concentration region interposed therebetween;
      wherein the step of providing the electron emitting member includes the steps of:
         forming an insulating layer acting as the electric field concentration region on a surface of particles acting as the electron emitting member,
         providing the substrate having a conductive layer acting as the electron transporting member formed thereon in a solution containing particles dispersed therein, and
         applying ultrasonic vibration to the solution to cause the particles in the solution to adhere to the conductive layer.

29. A method for producing an electron emitting device, comprising the steps of:
   forming an electron transporting member on a substrate; and
   providing an electron emitting member in contact with the electron transporting member with an electric field concentration region interposed therebetween;
      wherein the step of providing the electron emitting member includes the steps of:
         forming an insulating layer acting as the electric field concentration region on a surface of particles acting as the electron emitting member, and
         applying a solution containing particles dispersed therein to the conductive layer acting as the electron transporting member to cause the particles to adhere to the insulating layer.

30. A method for producing an electron emitting device, comprising the steps of:
   forming an electron transporting member on a substrate; and
   providing an electron emitting member in contact with the electron transporting member with an electric field concentration region interposed therebetween;
      wherein the step of providing the electron emitting member includes the steps of:
         forming an insulating layer acting as the electric field concentration region on a surface of particles acting as the electron emitting member, and
         using an electrophoresis process using a solution containing the particles dispersed therein to cause the particles to adhere to a conductive layer acting as the electron transporting member.

31. A method for producing an electron emitting device, comprising the steps of:
   forming an electron transporting member on a substrate;
   providing an electron emitting member in contact with the electron transporting member with an electric field concentration region interposed therebetween; and
   roughening a surface of the electron transporting member, wherein the step of roughening the surface of the electron transporting member includes the step of forming a conductive layer acting as the electron transporting member by a thermal spraying technique.

32. A method for producing an electron emitting device, comprising the steps of:
   forming an electron transporting member on a substrate,
   providing an electron emitting member in contact with the electron transporting member with an electric field concentration region interposed therebetween; and
   roughening a surface of the electron transporting member, wherein the step of roughening the surface of the electron transporting member includes the step of roughening a surface of the substrate, wherein the electron transporting member is formed on the roughened surface of the substrate.

33. A method for producing an electron emitting device, comprising the steps of:
   forming an electron transporting member on a substrate; and
   providing an electron emitting member in contact with the electron transporting member with an electric field concentration region interposed therebetween;
      wherein at least one of the electron transporting member and the electron emitting member is a diamond thin film grown by a vapor phase growth technique, the method comprising the step of distributing diamond growth nuclei having a distribution density of $1 \times 10^{10}/cm^2$ or more as a pre-vapor phase technique.

34. An electron emitting device according to claim 1, wherein the electric field concentrated in the electric field concentration region disappears when the electron emitting member has an equal potential with that of the electron transporting member due to the injection of electrons, and
   wherein the electric field concentrated in the electric field concentration region, which is stronger than the electric field concentrated between the electron emitting member and the electrode, is concentrated again when the electrons are emitted toward the electrode by the electric field concentrated between the electron emitting members and the electrode.

* * * * *